July 6, 1937. W. T. GOLLWITZER Re. 20,437

PRINTING MACHINE

Original Filed May 12, 1930 13 Sheets-Sheet 1

Inventor:
Walter T. Gollwitzer
By Wm. O. Belk
Atty.

July 6, 1937. W. T. GOLLWITZER Re. 20,437
PRINTING MACHINE
Original Filed May 12, 1930 13 Sheets-Sheet 2
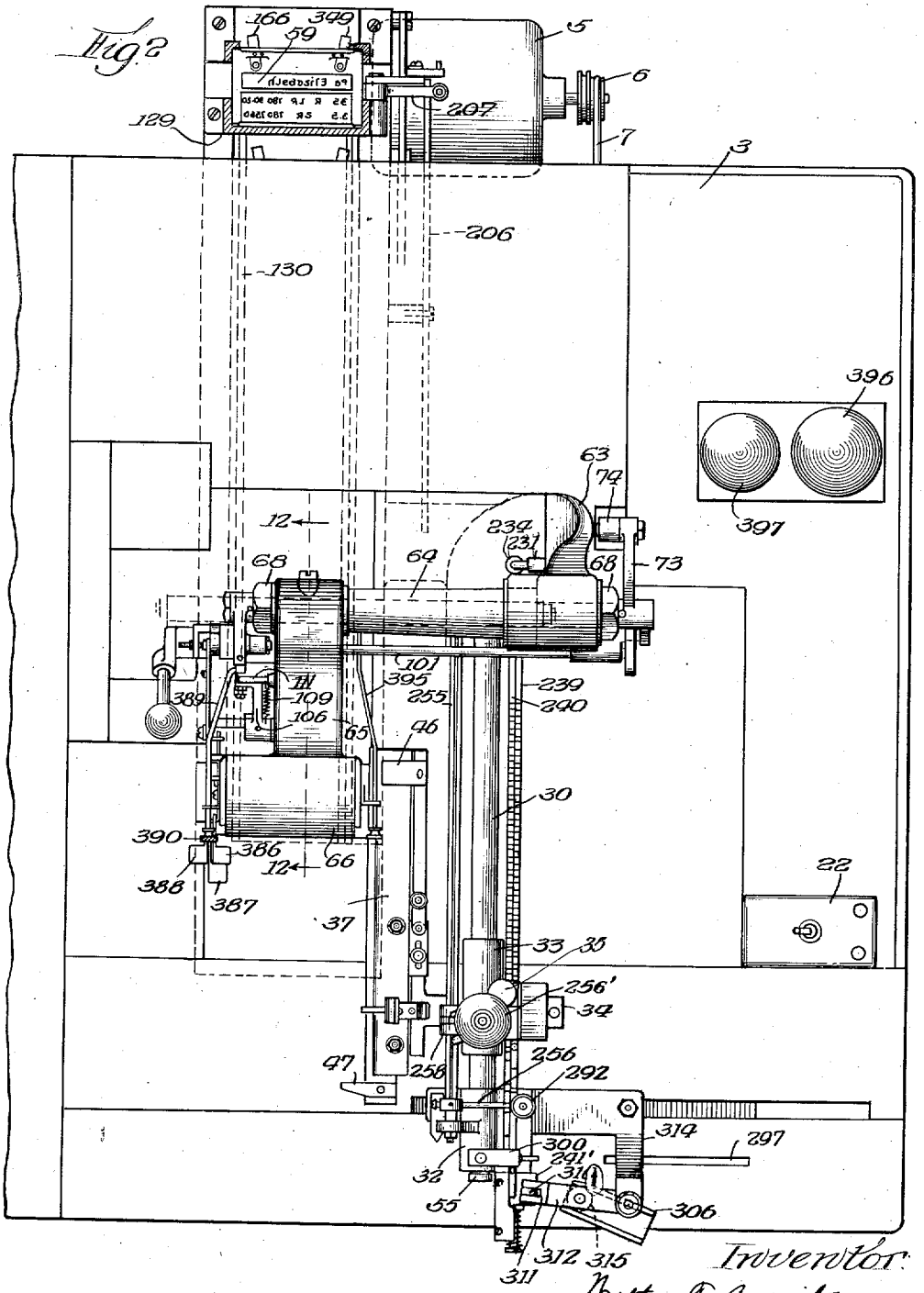
Inventor:
Walter T. Gollwitzer
By Wm. O. Belk
Atty.

July 6, 1937. W. T. GOLLWITZER Re. 20,437
PRINTING MACHINE
Original Filed May 12, 1930 13 Sheets-Sheet 3
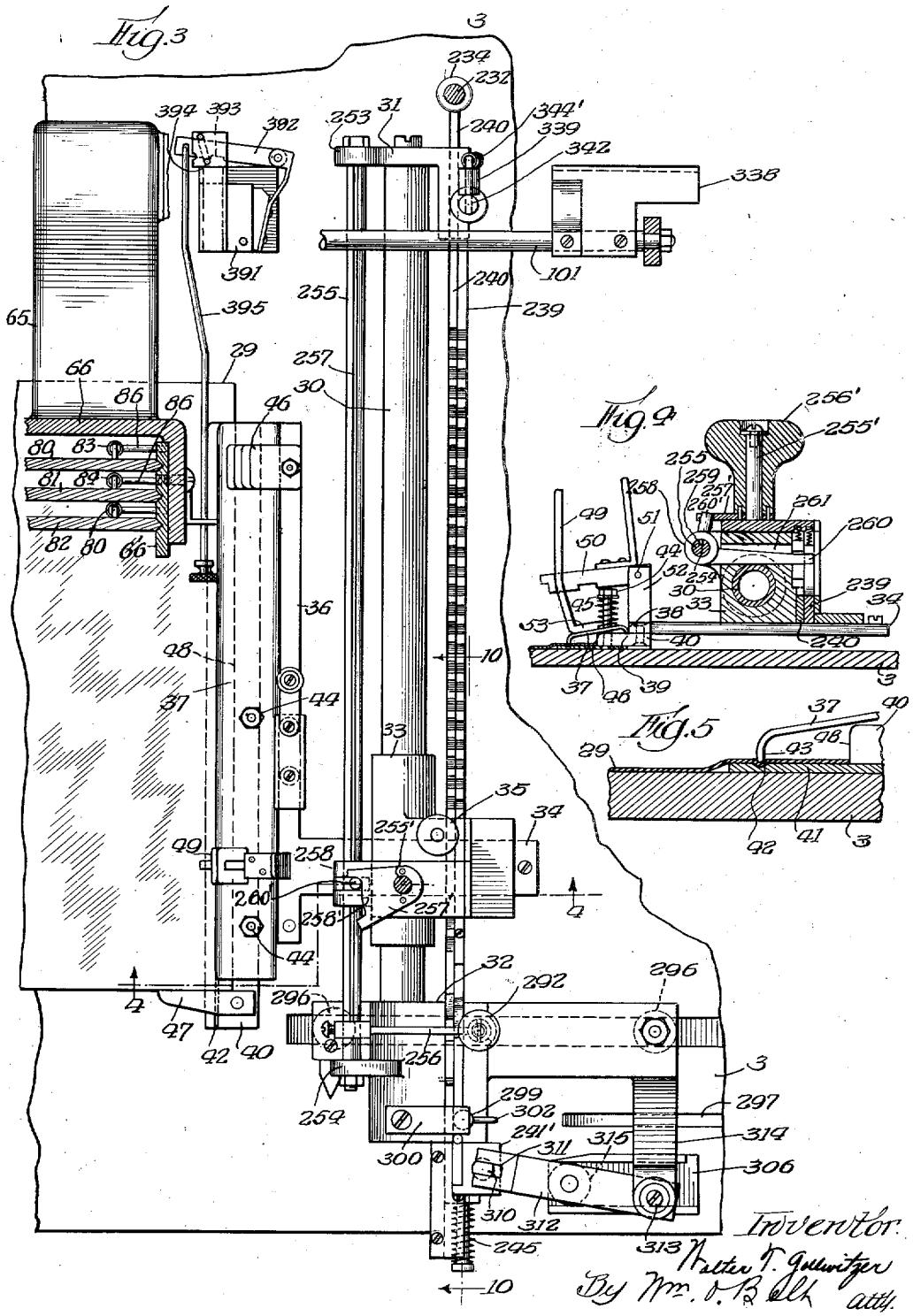

July 6, 1937. W. T. GOLLWITZER Re. 20,437
PRINTING MACHINE
Original Filed May 12, 1930 13 Sheets-Sheet 4
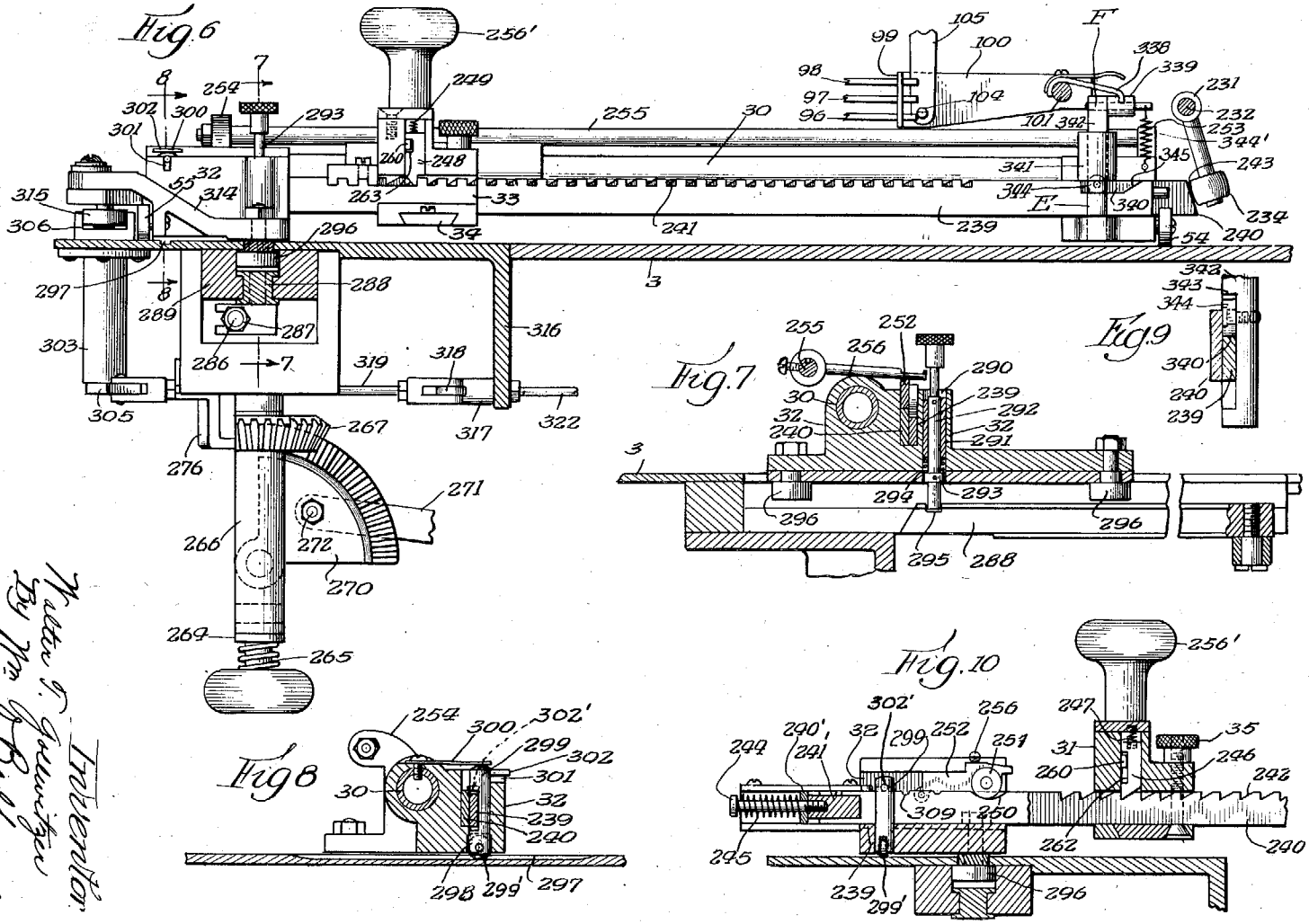
Inventor
Walter T. Gollwitzer
By Wm. J. Belk
Atty July 6, 1937. W. T. GOLLWITZER Re. 20,437

PRINTING MACHINE

Original Filed May 12, 1930 13 Sheets-Sheet 5

Inventor
Walter T. Gollwitzer
by M. H. Beck
Atty.

July 6, 1937. W. T. GOLLWITZER Re. 20,437

PRINTING MACHINE

Original Filed May 12, 1930 13 Sheets-Sheet 6

Inventor
Walter T. Gollwitzer
By Wm. P. Belknap

July 6, 1937. W. T. GOLLWITZER Re. 20,437

PRINTING MACHINE

Original Filed May 12, 1930 13 Sheets-Sheet 7

Inventor:
Walter T. Gollwitzer
By Wm. O. Belk Atty.

July 6, 1937. W. T. GOLLWITZER Re. 20,437

PRINTING MACHINE

Original Filed May 12, 1930 13 Sheets-Sheet 8

Inventor
Walter T. Gollwitzer
By Wm. S. Belk Atty.

July 6, 1937. W. T. GOLLWITZER Re. 20,437

PRINTING MACHINE

Original Filed May 12, 1930 13 Sheets-Sheet 9

Inventor:
Walter T. Gollwitzer
By Wm. S. Belk
Atty.

July 6, 1937. W. T. GOLLWITZER Re. 20,437

PRINTING MACHINE

Original Filed May 12, 1930 13 Sheets-Sheet 10

Inventor:
Walter T. Gollwitzer
By Wm. O. Belch Atty.

July 6, 1937. W. T. GOLLWITZER Re. 20,437

PRINTING MACHINE

Original Filed May 12, 1930 13 Sheets-Sheet 11

Inventor:
Walter T. Gollwitzer
By Wm. F. Belk Atty.

PRINTING MACHINE

Original Filed May 12, 1930 13 Sheets-Sheet 12

Inventor:-
Walter T. Gollwitzer
By Wm. V. Belk Atty.

PRINTING MACHINE

Original Filed May 12, 1930 13 Sheets-Sheet 13

Inventor:
Walter T. Gollwitzer
By Wm. O. Belk Atty.

Reissued July 6, 1937 Re. 20,437

UNITED STATES PATENT OFFICE 20,437

PRINTING MACHINE

Walter T. Gollwitzer, Cleveland, Ohio, assignor, by mesne assignments, to Addressograph-Multigraph Corporation, Cleveland, Ohio, a corporation of Delaware Original No. 1,987,900, dated January 15, 1935, Serial No. 451,812, May 12, 1930. Application for reissue August 17, 1936, Serial No. 95,484

59 Claims. (Cl. 101—47)

This invention relates to printing machines of the type in which individual printing devices are successively passed through printing position, and the salient object is to distribute impressions from different parts of each printing device in transposed relation on a sheet and to distribute the impression from successive printing devices in columnar relation on the sheet.

Another object is to provide a printing machine in which the sheet is movable in correlation with the impression operation.

Still another object is to arrest the printing device movement during the time impressions are made from different parts thereof.

A further object is to indicate the positioning of certain printing devices in printing position; and an ancillary object is to indicate certain operating conditions in the machine as when the last line on the sheet moves from printing position.

A still further object is to provide a printing machine in which the distribution of the impressions from different parts of a printing device on a sheet may either be manually or automatically performed.

Further objects of the invention are to simultaneously impart longitudinal and transverse movement to the sheet to effect movement of the sheet in a diagonal line; to control longitudinal movement of the sheet by a member movable into varied positions whereby the longitudinal movement may be varied; to employ a platen embodying sections respectively alined with separate groups of printing characters on the printing devices whereby the platens may be selectively released to print a separate group of printing characters; to impart a step-by-step movement to the sheet to space the lines of printing characters imprinted thereon and to effect this spacing upon predetermined shifting of the sheet transversely of the machine; to interrupt operation of the machine when the supply of printing devices in the printing device magazine is exhausted; to afford variation in the transverse movement imparted to the sheet; to yieldably interconnect the operating and operated parts of the machine to thereby prevent injury to the operated parts under abnormal conditions and avoid injury thereto; to effectively clamp the sheet in the lister to prevent relative movement between the lister and the sheet; to disconnect the printing device feeding mechanism during predetermined operations of the machine; to selectively determine whether or not impressions are to be made from the printing devices passing through the machines and to maintain the timed relation between the various operating parts when impressions are not made from selected printing devices; to determine transverse shifting of the sheet from the printing devices; and to time the operation of control devices in the machine so that operation thereof will be effected at the end of a cycle of operation of the operating mechanisms.

In the accompanying drawings a selected embodiment of the invention is disclosed and, therein:

Fig. 2 is a plan view of the machine illustrated in Fig. 1;

Fig. 3 is a fragmentary plan view of the sheet supporting and cooperating mechanisms;

Fig. 4 is a sectional view taken substantially on the line 4—4 of Fig. 3;

Fig. 5 is a sectional view drawn to an enlarged scale showing a portion of the paper clamping means illustrated in Figs. 3 and 4;

Fig. 6 is a view partially in elevation and partially in section looking in at the right hand side of Fig. 3;

Fig. 7 is a sectional view taken substantially on the line 7—7 of Fig. 6;

Fig. 8 is a sectional view taken substantially on the line 8—8 of Fig. 6;

Fig. 9 is a detail view of a portion of the device illustrated in Fig. 6;

Fig. 10 is a sectional view taken substantially on the line 10—10 of Fig. 3;

Figure 27:
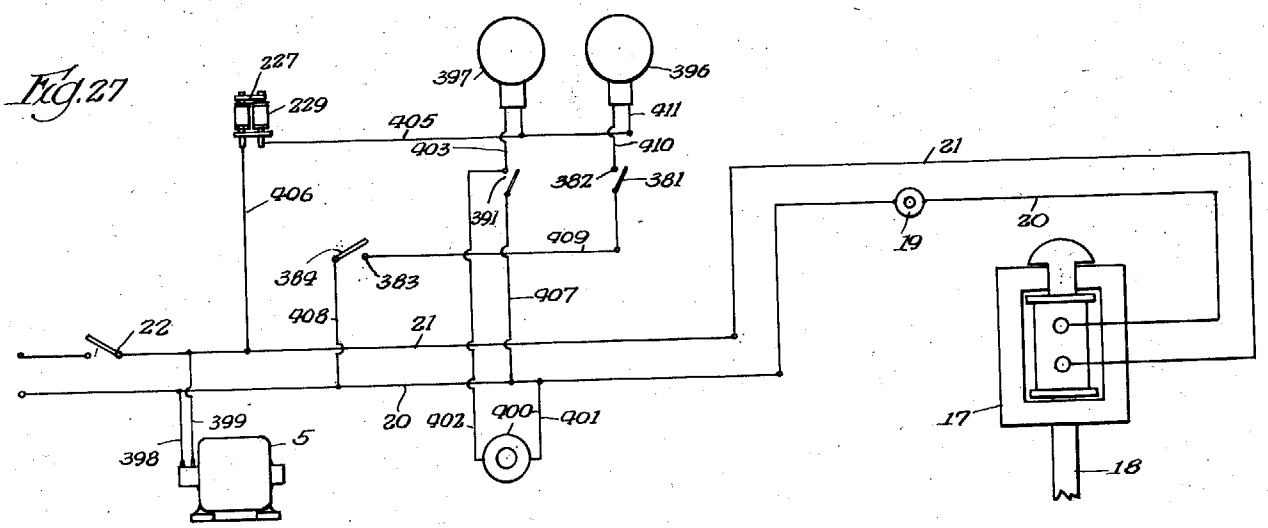
Fig. 27 is a diagrammatic view illustrating the electrical connections employed in the device.

Referring to the drawings, 1 indicates the main frame on which the various instrumentalities of my improved machine are mounted. The frame is mounted on casters 2 and supports the bed plate 3. A bracket 4 on the main frame supports an electric motor 5, the driving pulley 6 of which is connected by a belt 7 to a pulley 8 fixed on the shaft 9 journaled in the frame 1. Another shaft 10 is journaled in the frame 1 and has a flywheel pulley 11 thereon connected by a belt 12 to the pulley 13 fixed on the shaft 9. A clutch structure of the type commonly employed in machines of this kind and generally indicated by 14 connects the flywheel pulley 11 to the shaft 10. A lever 15 is pivoted on the frame 1 and the operating rod 16 of the clutch structure 14 is attached thereto. A solenoid 17 of approved form mounted on the frame 1 operates the link 18 connected to the lever 15. When the push button switch 19 (Fig. 27) is closed the machine is set in operation since this closes the circuit to the solenoid 17 from the line wires 20 and 21, the main switch 22 having been previously closed. The switches 19 and 22 are conveniently located in the machine. The switch 19 need only be momentarily closed since means, to be described hereinafter, including the link 23 attached to the lever 15 holds said lever in operating position during normal operation of the machine. A link 24 operated by a crank 25 on the shaft 10 is pivotally connected to the main operating member 26 at 27 and imparts rocking movement to said member 26. The member 26 is pivotally mounted, as indicated at 28, on a lug depending from the bed plate 3. The various instrumentalities of the machine are operated from the main operating member 26 and these instrumentalities function to perform the printing operations at predetermined places on the sheet 29 which is arranged on the bed plate 3 in the following manner:

As best shown in Figs. 2 to 6 inclusive, a guide bar 30 has one end thereof fixed in a supporting bracket 32 and the other end thereof is supported by an auxiliary bracket 31. Mounted for movement along the guide bar 30 is the lister slide 33. An adjustable arm 34 is mounted for movement in the lister slide 33 and is retained in adjusted position by the thumb screw 35, Fig. 10. At the outer end of the arm 34 is a supporting arm structure 36 on which a substantially channel-shaped clamp plate 37 is mounted. One edge 38 of the channel-shaped plate 37 rests in a groove 39, Fig. 4, in the bar 40, secured to the outer end of the arm 34, of the arm structure 36. Secured to the under side of the bar 40 and projecting forwardly therefrom is a flat plate 41 having a groove 42 therein in which the edge 43 of the channel-shaped plate 37 is rested. Extending upwardly from the bar 40 through the plate 37 are bolts 44. Disposed around the bolts 44 between the heads thereof and the plate 37 are coil springs 45 which, in cooperation with the flat springs 46 at the end of the arm structure 36, urge the plate 37 downwardly. A locating stud 47 is mounted at one end of the bar 40 and projects therefrom. The sheet 29 is abutted against the locating stud 47 and the adjacent edge 48 of the bar 40 when it is laid over the plate 41. A block 50 is pivotally mounted at 51 on the upright 52 extending from the bar 40. A grip member 49 includes a foot portion 53 secured to the clamp plate 37. During the insertion of the sheet 29 the edge 43 of the plate 37 is elevated by moving the grip member 49 to pivot the plate 37 about the edge 38. Since the sheet is inserted when the edge 43 on the plate 37 is elevated, it is apparent that when this edge is lowered a portion of the sheet will be forced into the groove 42, Fig. 5, by this edge 43 and will be very effectively clamped by the spring pressure exerted on the plate 37. As best illustrated in Fig. 6, the brackets 31 and 32 are respectively mounted on rollers 54 and 55 for movement transversely of the bed plate 3.

Figure 25:
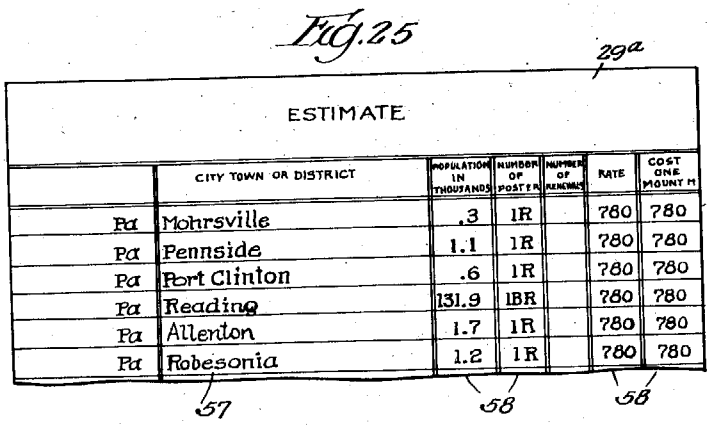

In Fig. 25 one form of sheet to be printed in the machine is illustrated. This sheet is indicated by 29*a* and the printing operations imprint indicia thereon in vertically alined relation. In the present instance, a portion of the indicia is imprinted in the vertical column 57. Other indicia is imprinted in the vertical columns 58. The indicia in the columns 57 and 58 is transversely alined and this transversely alined indicia is imprinted from characters on the same printing device or plate 59, Fig. 21. Two rows of printing characters 60 and 61 are provided on the printing devices 59. Above the rows 60 and 61 another row of printing characters 62 is provided. Indicia is imprinted on the sheet 29*a* in the columns 58 from either the row 60 or 61 while the indicia in the column 57 is imprinted from the characters in the row 62.

The printing operation is performed by so-called snapping platens which are retained in a cocked position against spring pressure. Releasing of the platens from cocked position enables the carrying out of the printing operation in a forcible manner. This platen construction will now be described. Extending upwardly from the bed plate 3 is a bracket 63, Figs. 2 and 14, and extending laterally across the machine from the upper end of the bracket 63 is a tubular supporting member 64, Fig. 28, having, at the outer end thereof, the platen arm 65. Mounted at the end of the arm 65, Fig. 2, is a platen housing 66.

The arm 65 is connected to the member 64 in the following manner. A sleeve 67, Fig. 12, unitary with member 64, has a flattened portion 69 and, bearing against this flattened portion, is a plate 70 secured to the end of the arm 65 by the bolts 71. A slight clearance between the plate 70 and the end of the platen arm 65 permits the plate to be disposed angularly to the end of the arm by varying the position of the bolts 71. The adjustment thus provided is employed to bring the lower end of the platen housing, and the platens mounted therein, into parallel relation with the bed plate 3 and the printing devices movable through guides in said bed plate.

Figures 1, 1A:
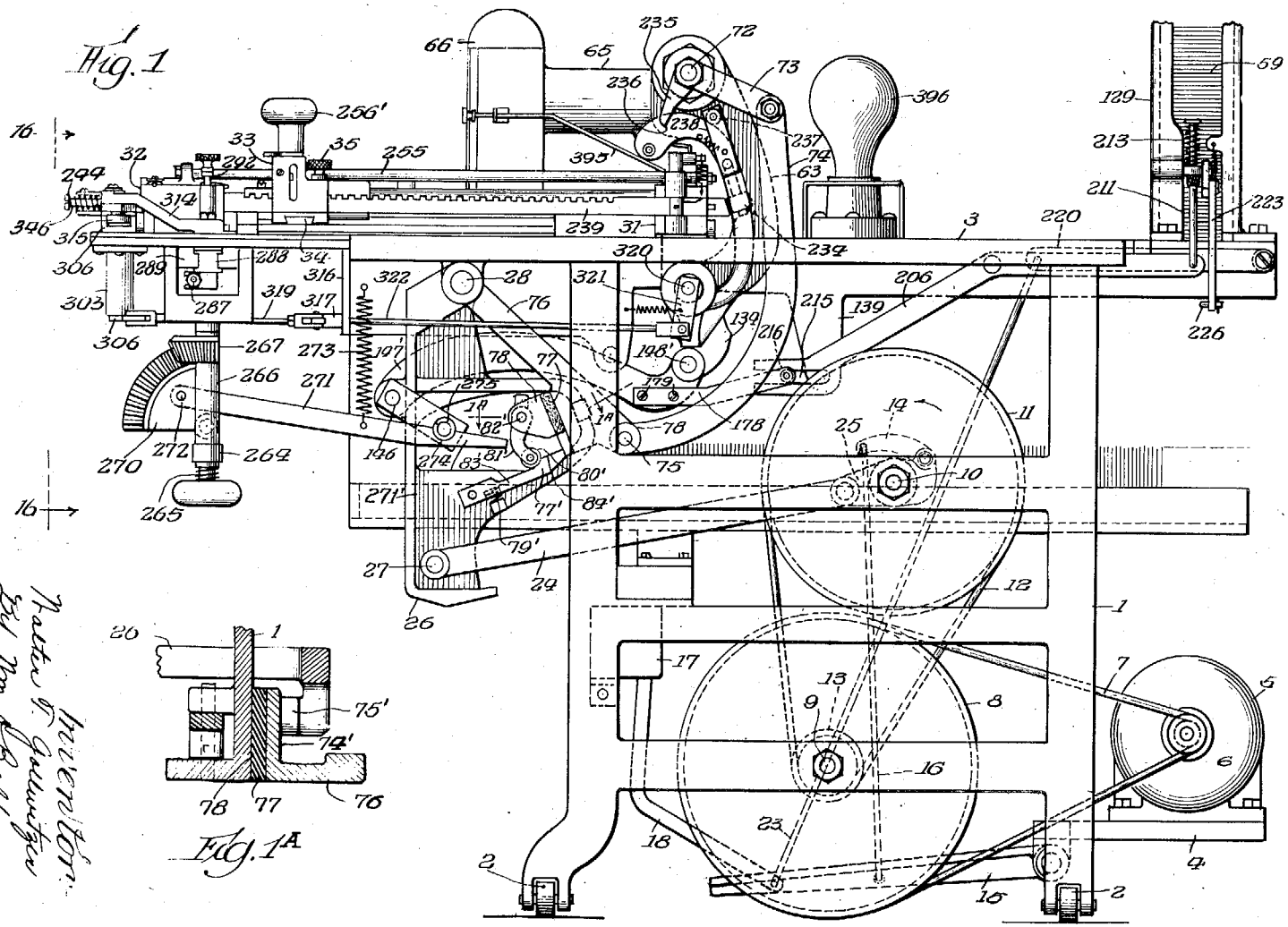
Fig. 1 is a side elevational view of a printing machine constructed in accordance with my invention.
Fig. 1A is a detail section taken on the line 1A—1A of Fig. 1.
Figures 11, 12, 13:
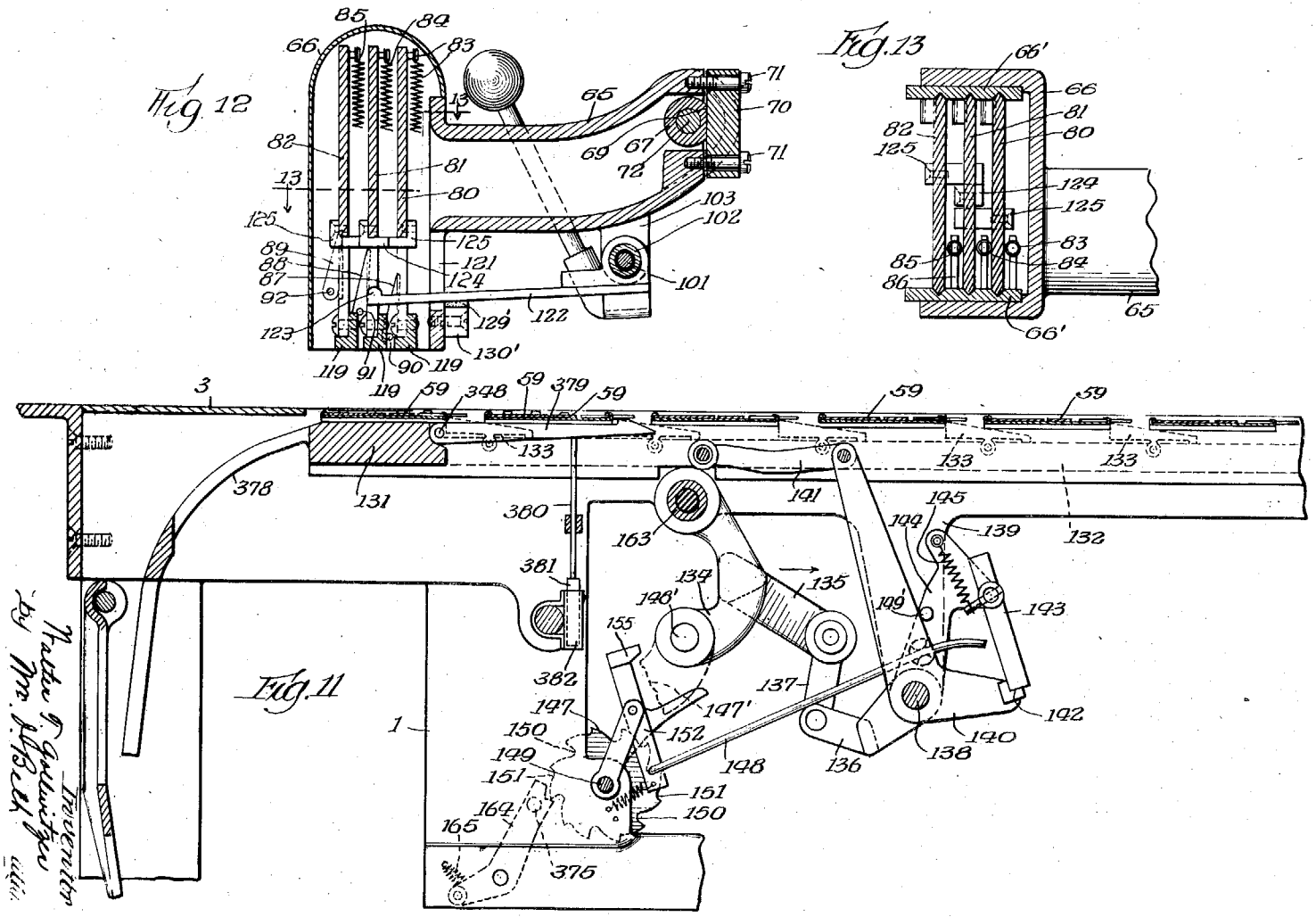
Fig. 11 is a view depicting the printing device advancing mechanisms and parts cooperating therewith.
Fig. 12 is a sectional view taken substantially on the line 12—12 of Fig. 2.
Fig. 13 is a sectional view taken substantially on the line 13—13 of Fig. 12.
Figures 14, 15:
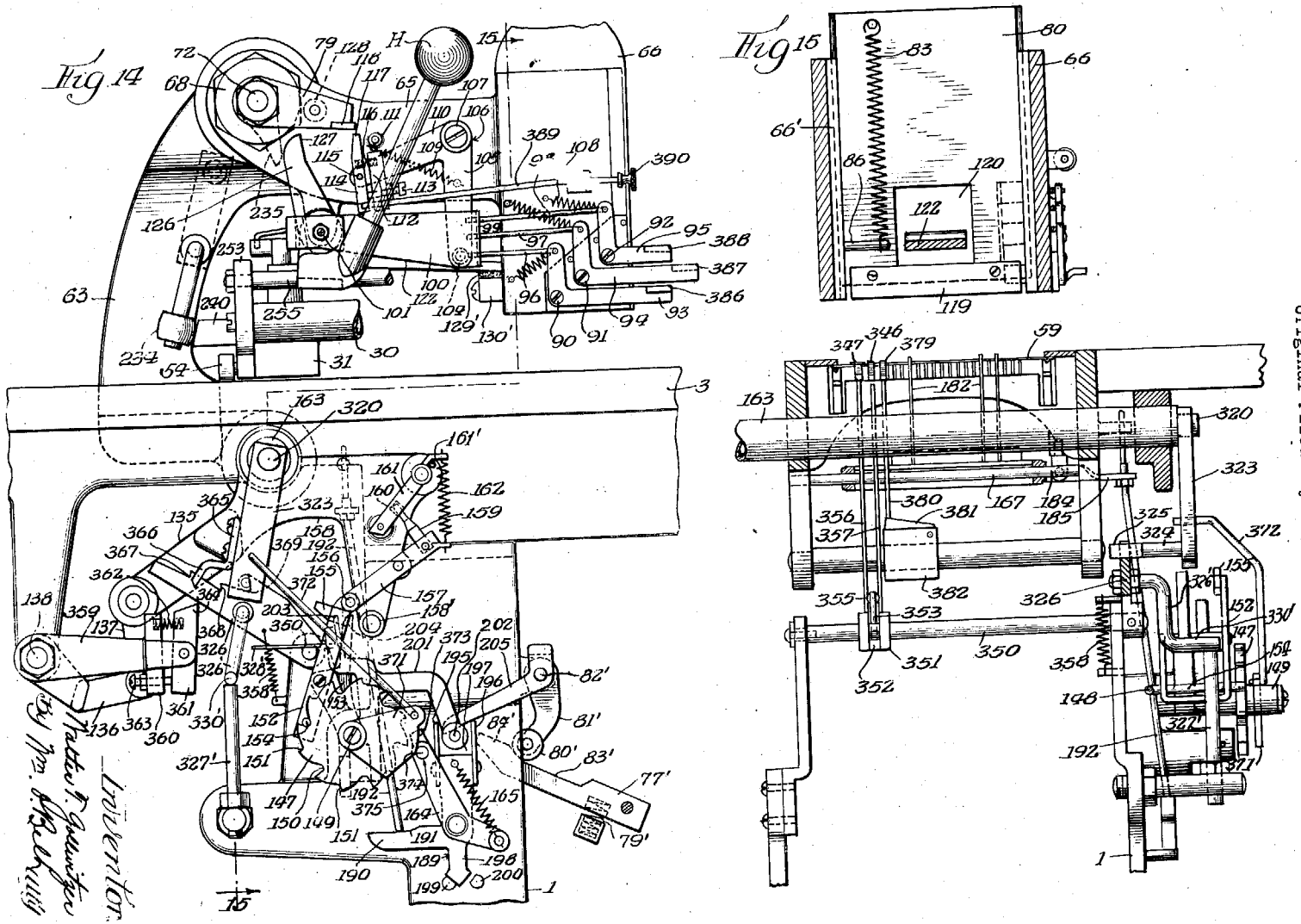
Fig. 14 is a view showing the platen operating devices and parts cooperating therewith.
Fig. 15 is a sectional view taken substantially on the line 15—15 of Fig. 14.

At the ends of member 64 are retaining nuts 68. Extending through the sleeve 67 is a shaft 72 to one end of which an arm 73, Fig. 1, is secured. Pivotally connected to the outer end of the arm 73 is a link 74 pivotally connected at 75 to an arm 76 pivotally mounted on the support for the main operating member 26, Fig. 28. On the arm 76 is a pad 77 that rests on the abutment 78 on the frame 1. A pawl 77′ engages a hardened portion 78′ on the arm 76. The pawl is pivotally mounted on the operating member 26 and is urged upwardly by the spring 79′ into engagement with the roller 80′ on the arm 81′ carried by the shaft 82′ pivotally mounted in the abutment 78. The shaft 82′ is moved, in a manner to be set forth, to dispose the roller 80′ either in the notch 83′ or on the rise 84′. When the roller 80′ is in the notch 83′ the pawl engages the portion 78′. Upon movement of the main operating member 26, in a counter-clockwise direction as viewed in Fig. 1, by the link 24 the pawl 77′ engaging the portion 78′ moves the arm 76 in a similar direction. This moves the arm 73 upwardly and this movement is transmitted through the shaft 72 to the arm 79, Fig. 14, mounted on the shaft 72 at the end opposite the arm 73 and this arm 79 moves downwardly upon such movement of the arm 73. Downward movement of this arm 79 selectively operates the platens in the following manner:

Guides 66′, Fig. 13, in the platen housing have vertical grooves therein in which the platen slides 80, 81 and 82 are slidably mounted. Spring anchors at the upper ends of the slides have springs 83, 84 and 85, Fig. 12, secured thereto, the other end of said springs being connected to the spring anchors 86 on one of the guides 66′, Fig. 15. The springs urge the platen slides downwardly. The platen slides are retained in upper position by the pawls 87, 88 and 89, Fig. 12, seated in notches in said slides and mounted on shafts 90, 91, and 92, that extend out through a wall of the housing 66. Substantially L-shaped arms 93, 94, and 95, Fig. 14, are mounted on these shafts exteriorly of the housing 66. Rods 96, 97, and 98, have corresponding ends thereof pivotally connected to corresponding ends of the arms 93, 94, and 95, respectively. The opposite ends of the rods are extended through openings in the flange 99 on the end of the arm 100 (Figs. 6 and 14) mounted on the shaft 101 journaled in the sleeve 102 (Fig. 12) carried by the lug 103 depending from the arm 65. In a manner to be set forth presently the arm 100 is moved to selectively aline the ends of the rods 96, 97 and 98 with the stud 104 at the outer end of the arm 105 of the bell crank 106 (Fig. 14) pivotally mounted at 107 on the arm 65. Springs 108 extend between the housing 66 and the ends of the arms 93, 94 and 95 and urge the ends of the rods 96, 97 and 98 through the openings in the flange 99 and these springs also urge the pawls 87, 88 and 89 into retaining position.

A spring 109, connected to the arm 105 of the bell crank 106, urges the stud 104 away from the ends of the rods 96, 97 and 98 and this action is limited by engagement of the arm 110 of the bell crank 106 with the stop 111 on the arm 65. Unitary with the arm 110 is a boss 112 having a set screw 113 mounted therein. The set screw 113 engages the lower end of the pawl 114 pivotally mounted at 115 at the outer end of the arm 110. A spring 116 is disposed between the pawl 114 and the boss 112 above the pivot 115 and urges the portion of the pawl below the pivot into engagement with the set screw 113. The nose 117 of the pawl 114 is disposed in the path of the pad 118 on the arm 79. As the arm 79 moves downwardly in the manner previously described the pad 118 engages the nose 117 and moves the pawl and bell crank as a unit to force the stud 104 into engagement with the rod alined therewith. If, for example, the rod 96 is alined, the arm 93 is pivoted and movement of this arm rotates the shaft 90 attached thereto. This shaft 90 rotates and moves the pawl 87 from the notch in the platen slide 80. At the lower ends of the platen slides the platens 119 are mounted and when the pawl 87 is retracted, as set forth, the spring 83 moves the platen slide 80 downwardly and the platen 119 connected thereto brings about a printing action in a manner to be set forth. Similarly, if the rod 97 is pushed the platen slide 81 is released. If the rod 98 is pushed the platen slide 82 is released in the manner above set forth.

As shown best in Fig. 15, each of the platen slides has a recess 120 in the lower edge thereof across the open end of which the platens 119 extend. Through an opening 121, Fig. 12, in the flange portion of the arm 65 another arm 122 is extended which arm 122 includes an enlarged nose portion 123. The arm 122 extends through the recesses in the platen slides and the nose 123 is disposed in the recess in the intermediate platen slide 81. On the outwardly disposed platen slides 80 and 82 pads 125, Fig. 13, are secured which extend into the recess 120 in the platen slide 81 on each side of the pad 124 disposed in this recess and connected to platen slide 81. The sleeve 102 is fixed in lug 103. The arm 122 is pivotally mounted on this sleeve. An arm 126, Fig. 14, is also pivotally mounted on the sleeve 102, and the arms 122 and 126 are connected. The end portion 127 of arm 126 is disposed in the path of the roller 128 on the arm 79. The pad 118 on the arm 79 has been described as engaging the nose 117 during its downward movement and after this engagement has continued for a period sufficient to cause actuation of one of the rods 96, 97, or 98, the pad 118 disengages the nose 117. As the arm 79 continues to move downwardly or clockwise, as viewed in Fig. 14, the roller 128 engages the end portion 127 of the arm 126 and turns this arm in a counter-clockwise direction. This movement is transmitted to the arm 122 and causes this arm to be moved upwardly into engagement with the pad 125 or 124 of the released platen, and the released platen is elevated as the arm 122 continues to move upwardly. As soon as the pad 118 disengages the nose 117 the spring 109 retracts the arm 105 and, therefore, the stud 104, which permits one of the springs 108 to reposition the shaft 90, 91, or 92, and the parts carried thereby, that have been moved. Therefore, one of the pawls 87, 88, or 89, seats in the previously released slide and retains this slide in its upper or cocked position thus tensioning the spring 83, 84 or 85 connected thereto. Operation of the machine is so timed that immediately after the arm 122 has restored the previously released platen slide the main operating member 26 starts to move in the opposite or clockwise direction, as viewed in Fig. 1. The arm 76 has a boss 74′, Fig. 1A, thereon that is disposed behind a boss 75′ on the main operating member 26. The clockwise movement of the main operation member engages the boss 75' with the boss 74' and the arm 76 is moved. This rotates the shaft 72 in a counter-clockwise direction, as viewed in Fig. 14, which disengages the roller 128 from the end portion 127 and as the pad 119 engages the nose 117 the pawl 114 pivots about the mounting 115 against the action of spring 116 and thus the bell crank 106 is not moved. Disengagement of the roller 128 from the end portion 127 permits the arm 122 to fall. Downward movement of the arm 122 is limited by engagement thereof with the pad 129', Fig. 12, on the upper edge of the block 130' fixed to the housing 65. In this position the arm 122 is disposed with the nose 123 thereof below the pads 124 and 125 and engagement of a pad therewith, when a platen is released, limits downward movement thereof. In the foregoing manner each of the platen slides may be selectively and automatically released to bring about a printing operation and subsequently restored to inoperation position.

Figure 22:
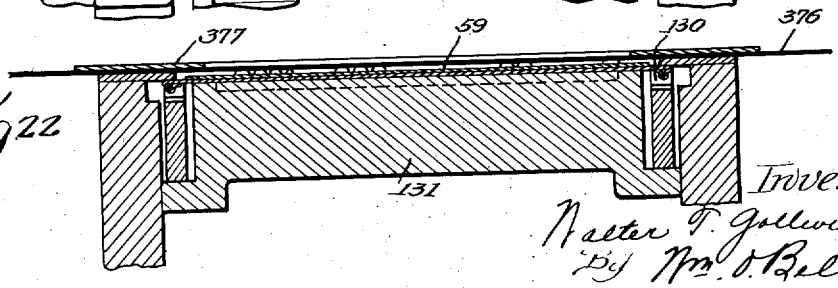
Fig. 22 is a sectional view taken substantially on the line 22—22 of Fig. 21.
Figure 24:
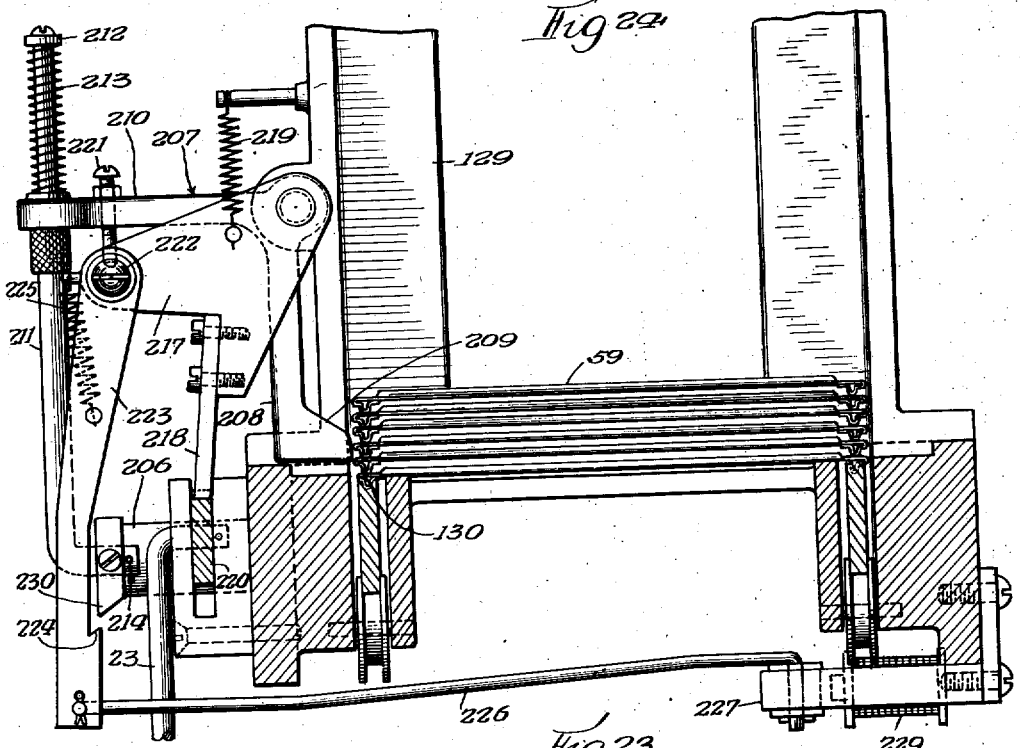
Fig. 24 is a sectional view taken substantially on the line 24—24 of Fig. 23.
Figure 23:
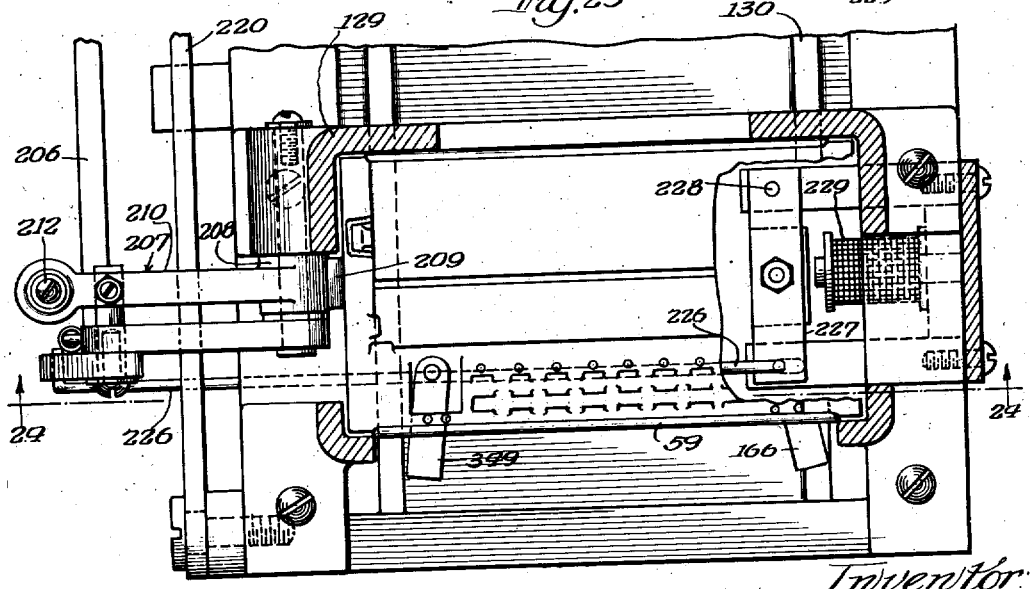
Fig. 23 is a horizontal detail view taken transversely of the printing device magazine.

The printing devices or plates 59 are arranged in a vertical stack in a magazine 129 positioned at the rear of the bed plate 3, Fig. 2, and from this stack the bottom devices are successively withdrawn and carried forward along the guideway 130, Figs. 2 and 24, to the anvil 131, Fig. 22. The printing devices are taken from the stack and fed forwardly in the guideway by the reciprocating feed bars 132, Fig. 11, positioned below the guideway 130 and reciprocal toward and away from the anvil 131. Feed pawls 133 on the feed bars 132 engage the rear edges of the devices 59 that are in the guideway 130 and when the bar is reciprocated the rearwardmost pawls engage the lowermost printing device in the magazine 129 and carry this device into the guideway. As reciprocation of the bars 132 is continued the pawls successively engage the rear edges of the device, during the forward portion of the reciprocating movement, the pawls freely passing under the printing devices during the rearward portion of the reciprocating movement, and thus the printing devices are advanced through the guideway in a step-by-step manner. The feed bars 132 are operated from the lever 134, Figs. 1 and 11, which has an extension arm 135 thereon that rocks the lever 136 through the link 137 connecting these members. The lever 136 is mounted on a shaft 138 journaled in a portion 139 depending from the bed plate 3. One arm of the bell crank 140, fast on the shaft 138, is connected by a link 141 to the feed bars 132. The other arm of the bell crank has a notched end 142 engaged by the spring urged trigger 143 mounted on the arm 144 of the lever 136, the spring 145 urging the trigger into the notch. An arm 146, Fig. 1, on the operating member 26, has a link 147' connected thereto and is also pivotally connected to the lever 134 at 148'. When member 26 moves in a counter-clockwise direction, as viewed in Fig. 1, movement is imparted through arm 146, link 147', lever 134, arm 135, to lever 136, through trigger 143, bell crank 140, to link 141, to move the bars 132 rearwardly. As the operating member 26 moves in a clockwise direction, as viewed in Fig. 1, the movement is transmitted as above to lever 136 and, the pin 149' engages the arm of the bell crank 140 to which the link 141 is connected and, in this manner, the bars 132 are moved forwardly.

Figure 19:
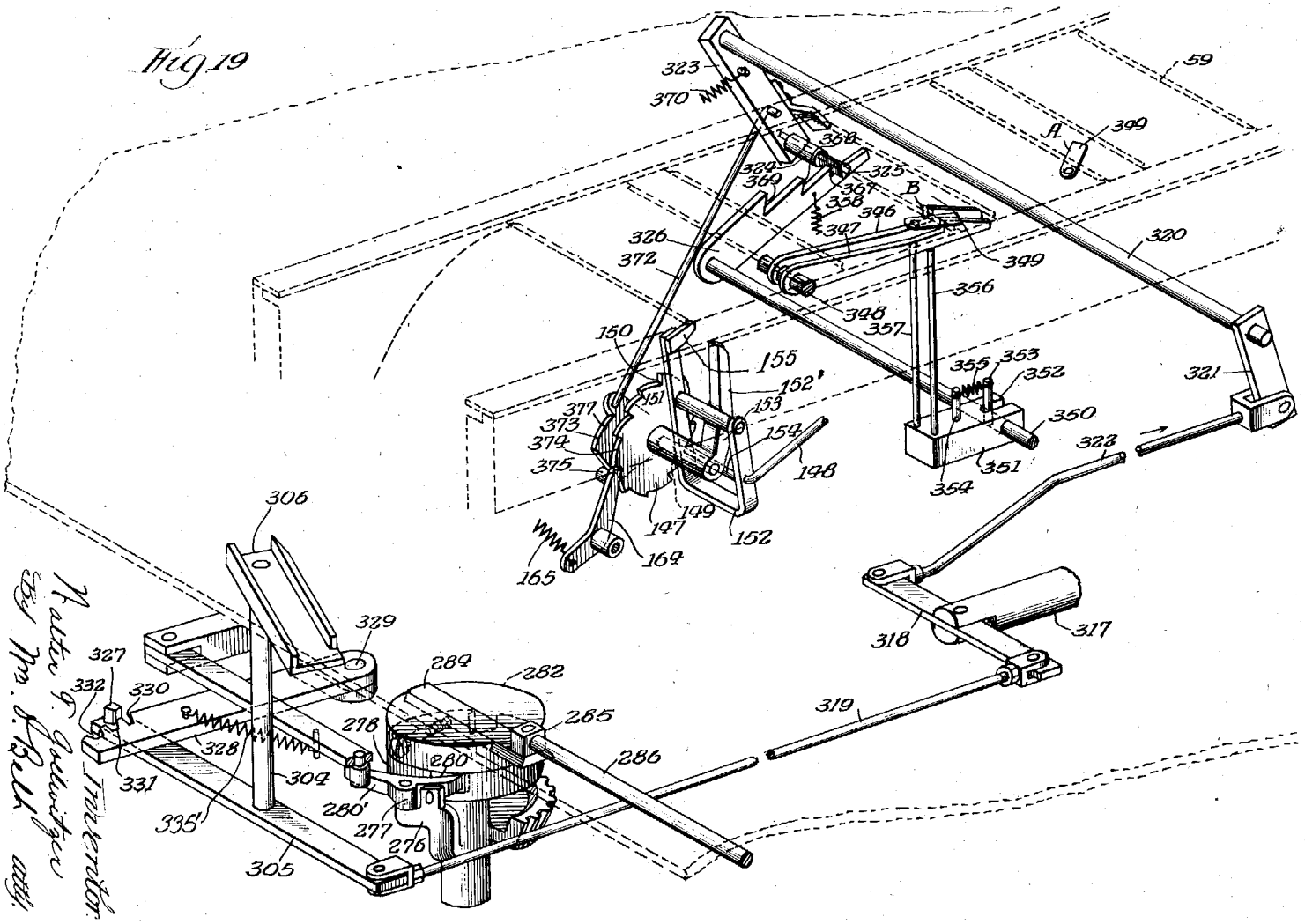
Fig. 19 is a perspective view illustrating the paper shift regulating devices.

In the machine as illustrated the printing devices are advanced only during alternate operations. To this end I provide the ratchet 147, Figs. 11, 14 and 19, and the push rod 148. The ratchet 147 is mounted on a shaft 149 journaled in the frame 1 and has a plurality of teeth on the periphery thereof. The teeth on the periphery of the ratchet 147 are so arranged that they effect the alternate feed of the printing devices and therefore the teeth are alternately deep and shallow, the deep teeth being indicated by 150 while the shallow teeth are indicated by 151. However, if a different advancing movement is to be imparted to the printing devices 59 a different arrangement of the deep and shallow teeth is provided, the particular arrangement depending upon the particular advance movement to be imparted to the printing devices. A step-by-step movement is imparted to the ratchet 147 in synchronism with the main operating member 26. The mechanism for doing this includes the U-shaped bracket 152 that is best illustrated in Fig. 19. The bracket 152 is supported from the shaft 149 by a casting 153. The right angularly extending end portion of the rod 148 is extended across the bracket 152 in juxtaposition to the bight portion thereof, and the end of the portion 154 is adapted to seat in the teeth 150 and 151, Fig. 14. The bracket 152 has a lug 155 at the upper end of one arm thereof which lug lies in the path of the stud 156 on the pawl 157, Figs. 14 and 28, pivotally mounted on the rocker 158. On the pawl 157 is a stud 159 seated in a socket 160 in the arm 161 pivotally mounted on rocker 158. A spring 162 extends between the pawl 157 and arm 161 and urges arm 161 into engagement with the stop pin 161'. The lever 134 is a part of the rocker 158 and when the link 147' first actuates the lever 134, the rocker 158 is moved with the shaft 163, Figs. 12 and 28, on which it is mounted, in a clockwise direction, Fig. 14. This moves the roller 153' into engagement with the lug 152' on the casting carrying bracket 152, Fig. 19, and movement is imparted through the bracket 152 and the portion 154 to the ratchet 147, and the ratchet is moved in a counter-clockwise direction, as viewed in Fig. 11. Pivotally mounted on the frame is a retaining pawl 164, Figs. 14 and 19, normally engaged in the teeth of the ratchet 147 by the spring 165. When the pawl 164 is seated in the teeth of the ratchet, as depicted in Fig. 19, and when the ratchet is moved in the manner above set forth, the pawl 164 rides over the teeth and prevents movement of the ratchet in the opposite direction. In this manner the step-by-step movement is imparted to the ratchet 147 and, therefore, the portion 154 is alternately disposed in a deep or shallow tooth. When the portion 154 is disposed in a deep tooth 150, as illustrated in Fig. 11, the end of the push rod 148 is retracted from engagement with the trigger 143 and this trigger remains seated in the notch 142 as shown in Fig. 11. However, when the portion 154 is disposed in the shallow tooth 151, the end of the push rod 148 engages the trigger and unseats the trigger from the notch 142. Therefore, when movement is imparted to the lever 136 no movement is imparted to the bell crank 140 by reason of this disconnection. Since the deep and shallow teeth are alternately arranged and, as a step-by-step movement is imparted to the ratchet 147 in synchronism with the operation of the lever 136, it is apparent that the trigger 143 is alternately seated and unseated and, therefore, movement is imparted in a rearward direction to the feed bars 132 only on alternate operations of the machine and, therefore, the printing devices 59 are only advanced upon alternate operations of the machine.

Figure 20:
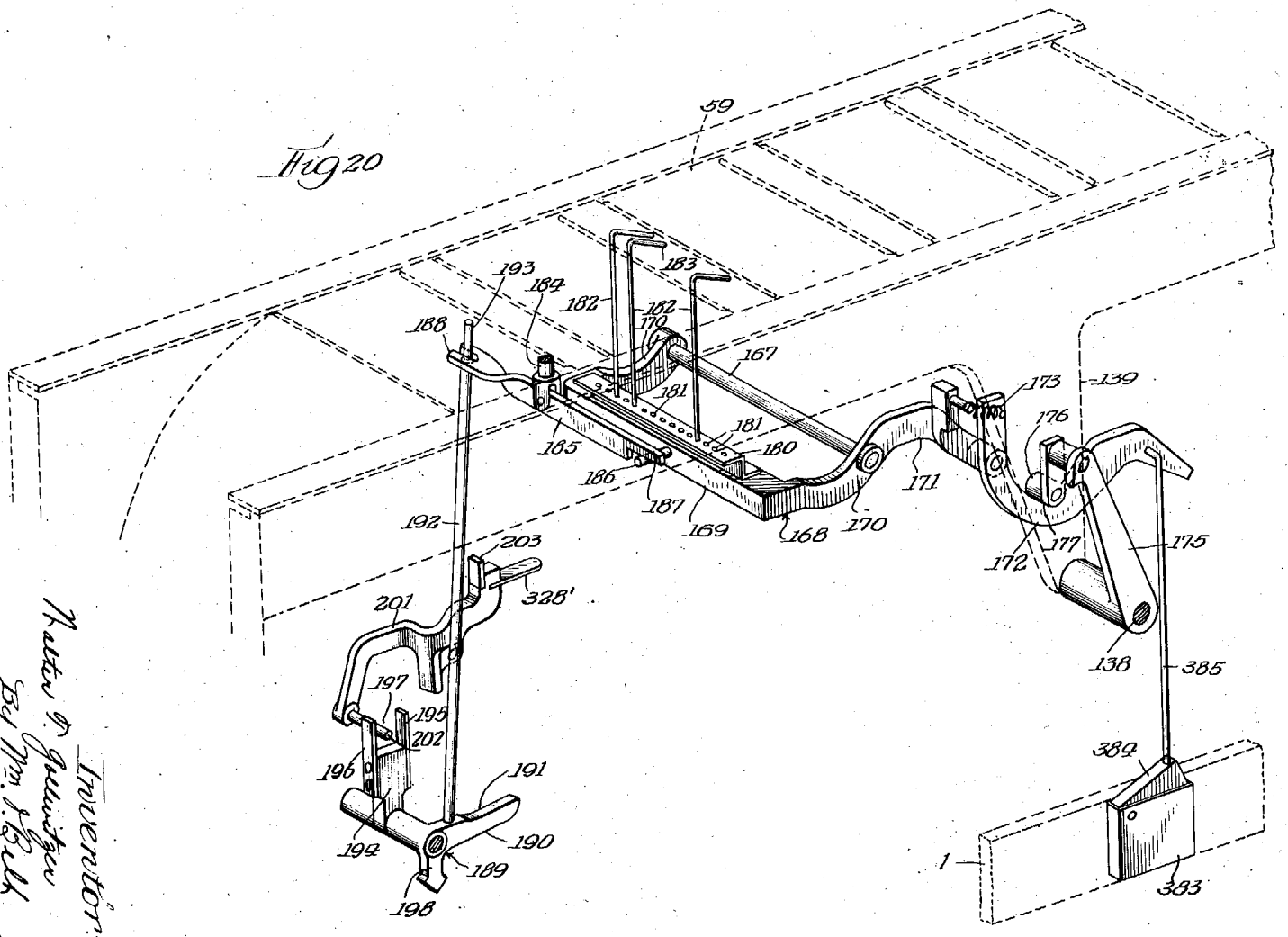
Fig. 20 is a perspective view of a detector arrangement and the mechanism operated thereby.

In the operation of machines of the character to which this invention appertains, it is often desirable to print from only certain ones of the printing devices, but it is also very desirable that the order of the printing devices not be interrupted. It is, therefore, customary to provide tabs 166 on the printing devices which may be engaged by a suitable detector arrangement. The printing devices are arranged in the magazine 129 in the usual manner and are successively fed through printing position, but only certain of the printing devices are used in a printing operation because of the mechanisms, to be described, which prevent printing operation. These mechanisms are controlled by the tabs 166 which may be disposed in different transverse locations on the printing devices 59, as is well understood. Further, the machine is arranged to either print or fail to print from the printing devices having tabs in certain positions, and the construction which enables the accomplishment of this includes the shaft 167, Fig. 20, journaled in the frame. A rockable member, generally indicated by 168, includes a transverse portion 169 from which bearing portions 170 are extended that are mounted on the shaft 167. An extension 171 of one of the bearing portions of the member 168 has a cam member 172 pivotally mounted thereon. A spring 173 interconnects the extension 171 and the member 172. Fast on the shaft 138, carried by the depending portion or lug 139 is a rocker 175 which includes a roller 176 that travels on the cam surface 177 of the member 172. When the shaft 138 is turned with the bell crank 140 the rocker 175 is oscillated and thus the roller 176 is caused to travel over the cam surface 177 to pivot the cam member 172, thus stretching the spring 173. When the spring 173 is stretched the portion 169 of the member 168 is urged upwardly. On the portion 169 is a plate member 180 which has a plurality of holes 181 therein in which vertical pins 182 may be mounted. The vertical pins 182 include substantially right angularly extending end portions 183 which are disposed below the printing devices or plates 59, Fig. 21. The pins 182 are alined with the tabs 166. If, therefore, when the portion 169 moves upwardly one of the portions 183 engages a tab 166, the upward movement of the portion 169 will be arrested. A bifurcated post member 184, Figs. 15 and 20, is mounted in the frame and a lever 185 is pivotally mounted therein. Extending outwardly from the portion 169 is a pin 186 on which the reduced portion 187 of the lever 185 is rested. When the portion 169 is permitted to move upwardly in an unrestricted manner, as when an end portion 183 does not engage a tab 166, the pin 186 engages the end portion 187 and moves this end of the lever 185 upwardly while the opposite horizontal bifurcated end 188 is moved downwardly. If, however, the member 169 is held against movement by the engagement of an end portion 183 with a tab 166, it is manifest that the spring 173 will merely be stretched, upon movement of the cam member 172, and, therefore, no effective movement will be imparted to the lever 185. A member, generally indicated by 189, (Figs. 14, 20 and 28) is pivotally mounted on the frame and includes a horizontally extending arm 190 having a recess 191 formed in the upper edge thereof. A vertically extending rod 192 is provided which includes a reduced end portion 193 that is mounted in the bifurcated end portion 188 of the lever 185, as clearly illustrated in Fig. 20. The lower end of the rod 192 rests either in the recess 191 or on the flattened upper surface of the arm 190. A projection 194 is carried by the member 189 and has blades 195 and 196 extending above the upper edge thereof providing a pocket 197. A downwardly depending arm 198 on the member 189 is disposed between two stops 199 and 200, Fig. 14. When the rod 192 is moved downwardly by the action of the lever 185 the member 189 will be rocked, thus rocking the projection 194 and the blades 195 and 196.

Pivotally mounted on the frame is an arm 201 which carries at the lowermost end thereof a pin 202, Fig. 20, that is arranged to cooperate with the blades 195 and 196 and the pocket 197. At the upper end of the arm 201 is a lug 203 which lies in the path of the nose 204 on the pawl 157. When the pawl 157 is moved in the manner set forth heretofore the nose 204 engages the lug 203 and pivots the arm 201 to elevate the pin 202. If the rod 192 is not moved the pin 202 will be free to move into the pocket 197. However, when the rod 192 is moved, either the blade 195 or 196 will be moved into position below the pin 202 and this pin will be prevented from entering the pocket 197.

Suitable means are provided for shifting the rod 192 either into or out of the recess 191. When the rod is in the recess 191 the member 189 will be disposed so that the end of the lug 198 will, under normal conditions, engage the stop 199. The shifting of the rod 192 is employed to accomplish either the printing or the failure to print or, as it is called, skipping, of the printing devices having tabs, such as 166, thereon, and this printing operation is controlled in the following manner:

An arm 205 is connected to the arm 81′ and has an end portion which rests on the pin 202. When the pin 202 engages either of the blades 195 or 196 and the pin 202 is prevented from downward movement the arm 205 will serve to hold the roller 80′ on the rise 84′. When the roller 80′ is held on the rise 84′ the end of the pawl 77′ will be held from engagement with the hardened portion 78′, Fig. 1 on the arm 76, but when the pin 202 moves into the pocket 197 the arm 205 will permit the roller 80′ to be positioned in the notch 83′ and, therefore, the end of the pawl 77′ will engage the hardened portion 78′. When so engaged, the arm 76 is moved and, as has been previously brought out, this arm 76 controls the platen operation and, therefore, the printing operation. Thus when the pin 202 engages either the blade 195 or 196, the printing operation is prevented, but when it moves into the pocket 197 the printing operation will be carried out. The particular use of this arrangement in the machine will be set forth hereinafter.

On the operation of the machine following the printing device feeding stroke, when the machine is arranged for duplicate printing operations, it is necessary that the pin 202 not be displaced. Therefore, when the portion 154 is in a shallow notch 151, the roller 156 rides on lug 155 and holds the nose 204 from engagement with lug 203 and, therefore, arm 201 is not moved.

An arrangement is provided for interrupting the operation of the machine when the last of the printing devices 59 has been removed from the magazine 129. This arrangement includes the lever 206, Fig. 1, pivotally mounted on the frame. A bell crank, generally indicated by 207, Fig. 24, includes an arm 208 having a foot portion 209 which extends through the side of the magazine 129 into engagement with the printing devices stacked therein. The arm 210 of the bell crank 207 has a rod 211 extended through the free end thereof which rod has an enlarged head 212 at the upper end thereof. A spring 213 is disposed around the rod 211 between the arm 210 and the head 212. The lower end of the arm 211 is bent to extend at right angles to the main extent thereof, and this bent portion, indicated by 214, is extended through the end of the lever 206. The other end of the lever 206 is bifurcated, as indicated at 215, and a roller 216, Fig. 1, on the free end of the arm 178, is disposed therein. The arm 178 is connected to the link 147′, as indicated at 179, and when the link 147′ is reciprocated, in the manner set forth, the roller 216 will move through the bifurcation 215 and reciprocate the lever 206 to move the rod 211 vertically. The downward portion of the movement imparted to the rod 211 causes compression of the spring 213 which will act on the arm 210 of the bell crank 207 to urge the foot portion 209 toward the printing devices 59. However, as long as there are any printing devices 59 in the magazine, the foot portion 209 is prevented from inward movement and, therefore, the vertical reciprocation of the rod 211 merely causes alternate compression and expansion of the spring 213. A pivotally mounted dog 217, Fig. 24, has a latch 218 extending therefrom. A spring 219 acts on the dog 217 to urge the latch 218 into the position shown in Fig. 24 wherein it is shown as being positioned above the bar 220. The rod 23, Figs. 1 and 24, is connected to the bar 220 and when the lever 15 is moved downwardly to start the machine, in the manner set forth, the movement is transmitted through the rod 23 to the bar 220, and this bar is moved downwardly and the latch 218 moves into position thereabove, as illustrated in Fig. 24, to prevent upward movement of the bar 220 and, in this manner, the machine is held in operation. However, when the foot portion 209 pivots inwardly and does not engage at least one printing device in the magazine 129, the set screw 221, carried by the arm 210 of the bell crank 207, engages the stud 222 on the dog 217 and pivots the dog to move the latch 218 from position above the bar 220 which permits this bar to move upwardly and, manifestly, this upward movement of the bar 220 imparts similar movement to the rod 23 which permits the lever 15 to move upwardly and thus interrupt operation of the machine.

Mounted on the stud 222 is an arm 223 having a notch 224 therein adjacent the lower edge thereof. A spring 225 acts on the arm 223 to normally hold this arm in the position illustrated in Fig. 24. Connected to the lower end of the arm 223 is a link 226. The other end of the link 226 is connected to the armature 227 that is pivotally mounted at the lower end of the magazine, as indicated at 228. A magnet 229 is provided and, when this magnet is energized, in the manner to be set forth, the armature 227 is attracted and the movement thus imparted is transmitted through the link 226 to the arm 223 and this arm is moved against the action of the spring 225 to position the notch 224 below the projecting nose 230 of the arm 206. Therefore, when the arm 206 is moved downwardly, during normal operation, in the manner previously set forth, the projection 230 seats in the notch 224 and the arm 223 will be moved downwardly which moves the dog 217 to move the latch 218 from retaining position. The spring 225 normally holds the notch 224 from alinement with the projection 230. The spring 219 acts on the dog 217 at all times and, therefore, as soon as the lever 15 is moved downwardly, which results in similar movement being imparted to the bar 220, it is manifest that the latch 218 moves into retaining position which is illustrated in Fig. 24.

Figure 28:
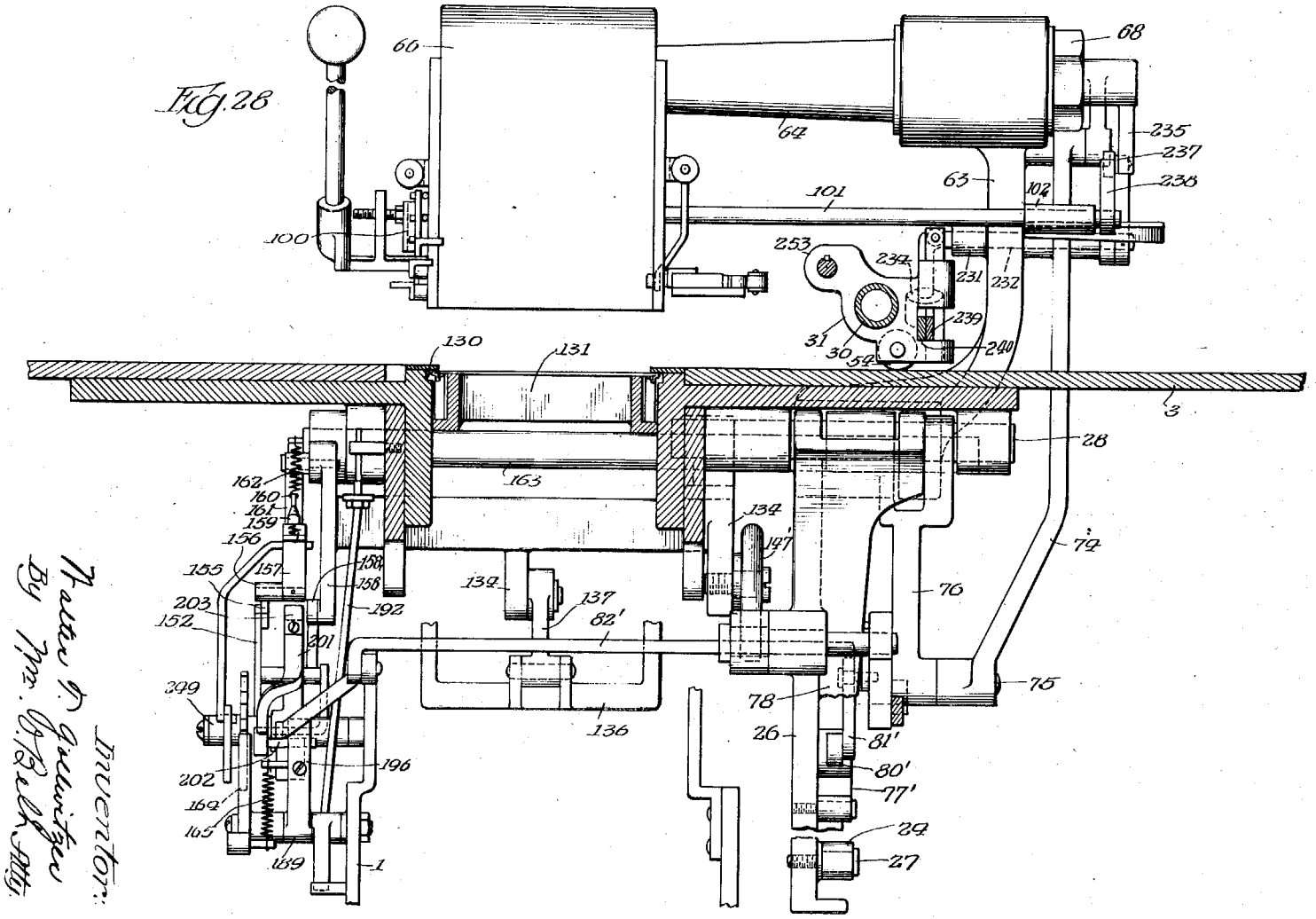
Fig. 28 is a transverse sectional view.

The devices which clamp the paper and associated mechanisms constitute the means to bring about the proper distribution of the printing on the sheet 29. These mechanisms comprise the brackets 31 and 32, the tubular support 30, and the lister slide 33. This lister slide is movable along the support 30 to move the sheet 29 to bring about the vertical spacing between the various transverse rows of indicia. This spacing is carried out at the time the sheet is arranged to receive impressions in the column 57 and is accomplished in the following manner: on the bracket 63 a bearing 231, Fig. 28, is provided in which a shaft 232 is journaled which includes a right angularly extending portion having a roller 234 at the lower end thereof. On the end of shaft 72 opposite the arm 79 is an arm 235, Fig. 1, which includes a nose portion 236. On the arm 238, mounted on the shaft 232, is a stud 237. When the shaft 72 is operated in the manner previously set forth the arm 235 is moved and the nose 236 thereof engages the stud 237 to move the arm 238, shaft 232, and the roller 234. When the machine is arranged to bring about the imprinting of the indicia in the column 57 the spacing mechanisms are alined with the roller 234, as illustrated in Figs. 2 and 3. These spacing mechanisms include the racks 239 and 240 slidably mounted in the brackets 31 and 32 and extended through the lister slide 33. The rack 239 has square teeth 241 provided therein, as best illustrated in Fig. 6, and will be referred to hereinafter as the locking rack. The rack 240 has ratchet teeth 242 provided therein, as best illustrated in Fig. 10, and this rack will be referred to hereinafter as the spacing rack. The forward end of the spacing rack 240 is tapered, as indicated at 243, Fig. 6, and the roller 234 bears against this tapered end.

The ends of the racks 239 and 240, opposite the ends adjacent the roller 234, extend through a recess in the bracket 32. A block 241′, Fig. 10, supports a stud 244 which extends through a projection 240′ on the rack 240, which projection extends past the block 241′. The rack 239 is secured to the block 241′. A coil spring 245 is disposed about the stud 244 between the head thereof and the projection 240′. When the roller 234 is moved, in the manner set forth, during engagement with the end 243 of the spacing rack 240, the spring 245 is compressed. In the lister slide 33 a pawl 246, Fig. 10, is slidably mounted which is urged into seating engagement with the teeth 242 by the spring 247. When the rack 240 is moved in the manner set forth, this pawl 246 rides over the beveled portion of the tooth in the rack 240 which it has been engaging and then drops behind the shoulder of the succeeding tooth. During this time the lister slide 31 is held against movement by the seating of the pawl 248, Fig. 6, in the teeth 241 of the locking rack 239, said pawl being urged into such engagement by the spring 249. As best illustrated in Fig. 10, a recess 250 is provided in the upper edge of the rack 239 rearwardly of the teeth 242. A roller 251, mounted on the pawl 252, seats in this recess. The pawl 252 is mounted on the rack 240. A bearing 253, Fig. 3, is provided on the bracket 31 and a bearing 254, Fig. 3, is provided on the casting 32. A rod 255 is rotatably mounted in these bearings 253 and 254. Secured to this rod 255 is a pin 256, Fig. 7, which rests on the upper edge of the pawl 252. When the spacing rack 240 is moved by the roller 234 to compress the spring 245 the roller 251 rides out of the notch 250 and moves the pin 256 upwardly. In the rod 255 a groove 257 is provided and a collar 258, Fig. 4, carried by the lister slide 33, and through which the rod 255 is extended, has a pin 259 thereon which travels in this groove. Connected to the collar 258 is an arm 260 which extends through an opening 261, Fig. 4, in the lister slide 33. The arm 260 also extends through the notch 262 in the side of the pawl 246, Fig. 10, and into the notch 263 in the side of the pawl 248, Fig. 6. When the pin 256 is raised in the manner set forth, the rod 255 is rotated and, therefore, the collar 258 and the arm 260. The arm 260 is moved sufficiently to withdraw the pawl 248 from engagement with the teeth 241 and, following this, the lister is moved transversely, in a manner to be described, to disengage the end 243 of rack 240 from the roller 234. The pawl 246 is seated in the teeth 242, as the above described movement of the arm 260 does not unseat this pawl, and therefore the lister slide 33 is moved forwardly when the spring 245 is permitted to expand which follows the above described disengagement of the end 243 from the roller 234. The expansion of this spring moves the lister slide 31 a distance equal to the length of one tooth on rack 240. As soon as the spring 245 has expanded sufficiently to move the spacing rack 240 in the above described amount, the roller 251 reenters the notch 250 and the pin 256 is lowered. This permits the arm 260 to drop and the pawl 248 reseats in a tooth 241. Therefore, the racks are disposed similarly to the disposition thereof prior to the movement imparted to rack 240 by roller 234. The foregoing operation moves the lister slide in an amount sufficient to provide proper spacing between the transverse rows of indicia on the sheet 29*a*. Inasmuch as the spacing depends upon the spacing of the teeth in the racks, it is manifest that different spacing may be easily secured by substituting, for the racks 239 and 240, other racks having different tooth spacing.

Figure 16:
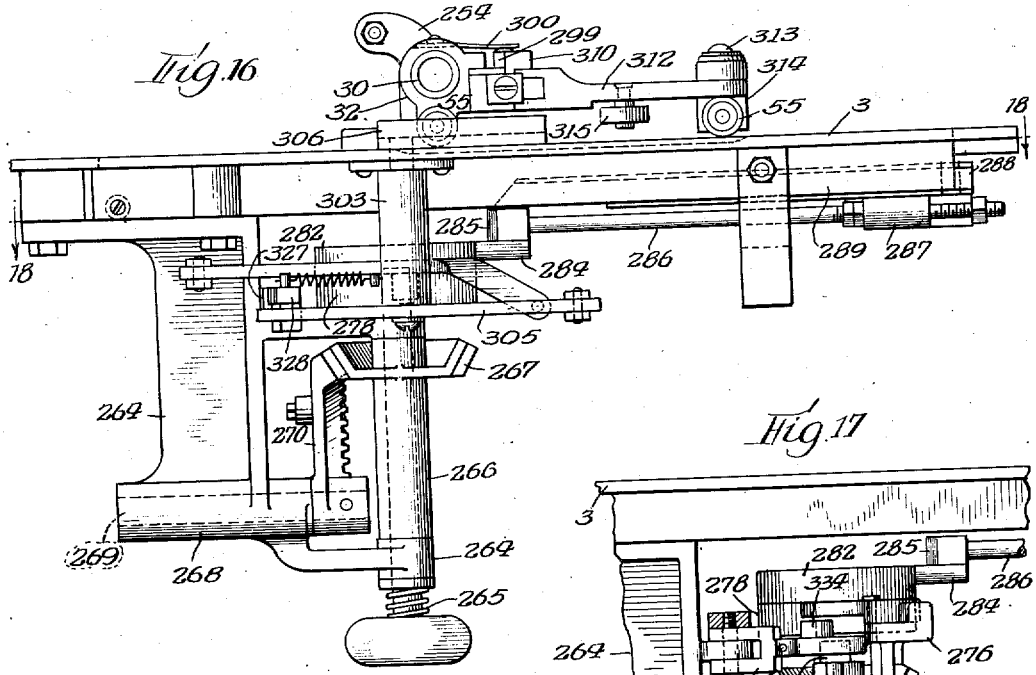
Fig. 16 is an elevational view on the line 16—16 of Fig. 1.
Figure 17:
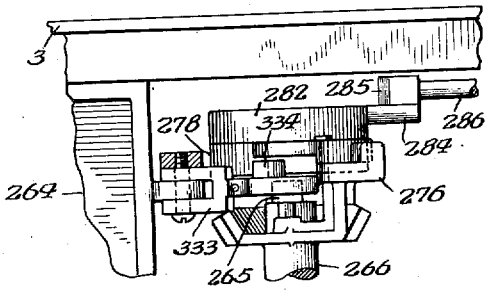
Fig. 17 is a detail view of a portion of the apparatus shown in Fig. 16.
Figure 18:
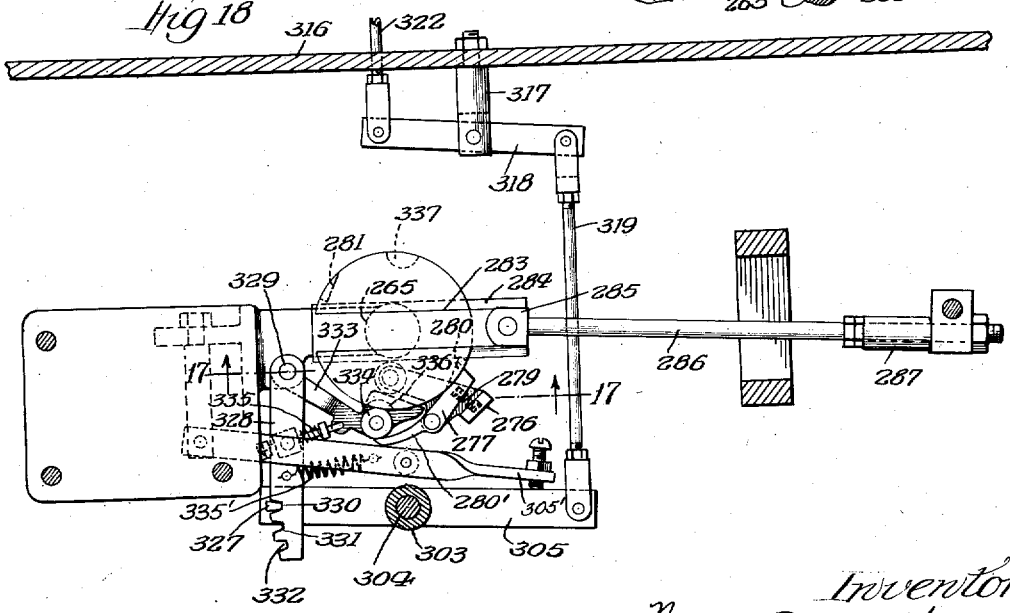
Fig. 18 is a sectional view taken substantially on the line 18—18 of Fig. 16.

In order to distribute the printing in either of the columns 57 or 58 the lister structure is shifted transversely of the machine to similarly shift the sheet 29. This is done in the following manner: A bearing structure 264, Figs. 1 and 16, supports a shaft 265 about which a sleeve 266 is arranged. A bevel gear segment 267 is secured on the sleeve 266. The bearing structure 264 includes a sleeve bearing 268, Fig. 16, in which a shaft 269 is journaled. Fixed on the shaft 269 is a bevel gear segment 270 which meshes with the bevel gear segment 267. One end of a link 271 is pivotally connected to the gear segment 270, as indicated at 272, Fig. 1. A spring 273 extends between the link 271 and the frame of the machine and urges the link upwardly in order that the recess 274 therein will fit about the stud 275 on the main operating member 26. This provides a safety arrangement as the link 271 will move to disengage the recess 274 from stud 275 if the mechanisms operated by link 271 should jam. When the main operating member 26 is moved in the counter-clockwise direction, as viewed in Fig. 1, as previously set forth, this movement is transmitted through the link 271 to the gear segment 270 to impart movement to the gear segment 267, the gear segments 270 and 267 being moved from the position illustrated in Fig. 1 into the position illustrated in Fig. 6. Mounted at the upper end of the sleeve 266 is a bracket 276 on which a pawl 277, Fig. 18, is pivotally mounted. The pawl 277 is urged toward the disk 278, Fig. 17, by the spring 279, Fig. 18. Diametrically opposed notches 280 and 281 are provided in the periphery of the disk 278 and the pawl 277 may be alternately seated in these notches. During the time the main operating member 26 is moving in a counter-clockwise direction as described the gear segment 267 is being moved from the position illustrated in Fig. 1 into the position illustrated in Fig. 6, and the bracket 276 will be moving in a clockwise direction, as viewed in Fig. 18. Referring to Fig. 18, when the bracket 276 is moved, as above, the pawl 277 is withdrawn from the notch 281 and moved over the periphery of the disk 278 until said pawl seats in the notch 280. When the main operating member 26 starts to move in the opposite or clockwise direction the gear segment 267 is moved from the position illustrated in Fig. 6 into the position illustrated in Fig. 1 and during this movement the bracket 276 moves in a counter-clockwise direction, as viewed in Fig. 18, and, by reason of the engagement of the pawl 277 with the shoulder of the notch 280, the disk 278 is moved. Mounted above the disk 278 is a disk 282 having a diametrical dovetail slot 283 therein. A slide 284 is adjustably mounted in the dovetail slot 283 and the connecting member 285 is pivotally mounted on one end of the slide 284. A rod 286 is attached to the connecting member 285 and suitable connecting means 287 interconnects the slide 288 and the free end of the rod 286. The slide 288 is slidably mounted in the block 289, Fig. 6, carried on the frame of the machine, said slide 288 being movable transversely of the machine. By reason of the arrangement including the pawl 277 it is manifest that, upon a complete operation of the main operating member 26, the slide 288 is moved in one direction and on the successive complete operation of the main operating member 26 the slide 288 is moved in the opposite direction. In the casting 32, an opening 290, Fig. 7, is provided in which a sleeve 291 is arranged. A pin 292 is fitted in the sleeve 291 and includes an enlarged portion 293. A spring 294 is fitted about the pin 292 between the enlarged portion 293 and the lower end of the sleeve 291 and urges the pin 292 downwardly to position the lower end of said pin in the notch 295 in the slide 288. Therefore, when the slide 288 is reciprocated, in the manner set forth, and when the pin 292 is seated in the recess 295 it is apparent that the casting 32 will be moved transversely of the machine. Rollers 296, Figs. 3 and 6, carried by the casting 32, travel in the trackway above the slide 288 and serve to guide the casting 32 during transverse movement across the machine. By reason of the mounting of the tubular support 30 in the bracket or casting 32, it is apparent that this tubular support and, therefore, the bracket 31 moves with the bracket 32, said brackets 31 and 32 being mounted on the rollers 54 and 55. Since the sheet 29 is supported by means carried by the brackets 31 and 32, it is apparent that the sheet is moved transversely of the machine. In the upper surface of the bed plate 3 a groove 297, Figs. 3, 6 and 8, is provided. In the casting 32 is an opening 298, Fig. 8, in which a pin 299 is arranged. A spring 300 bears on the upper end of the pin 299 and urges the pin 299 downwardly. A pin 302, at the upper end of the pin 299, is extended into a slot 301, Figs. 6 and 8, in the casting 32. At the lower end of pin 299 is a roller 299'. When the lister moves to the right as viewed in Fig. 2, as will be described, the roller 299' enters and travels in groove 297. In this manner the casting 32 is held against longitudinal movement. Further, the pin 302', Figs. 8 and 10, enters one of the notches 309 in the rack 239 to hold the racks against longitudinal movement.

Figure 21:
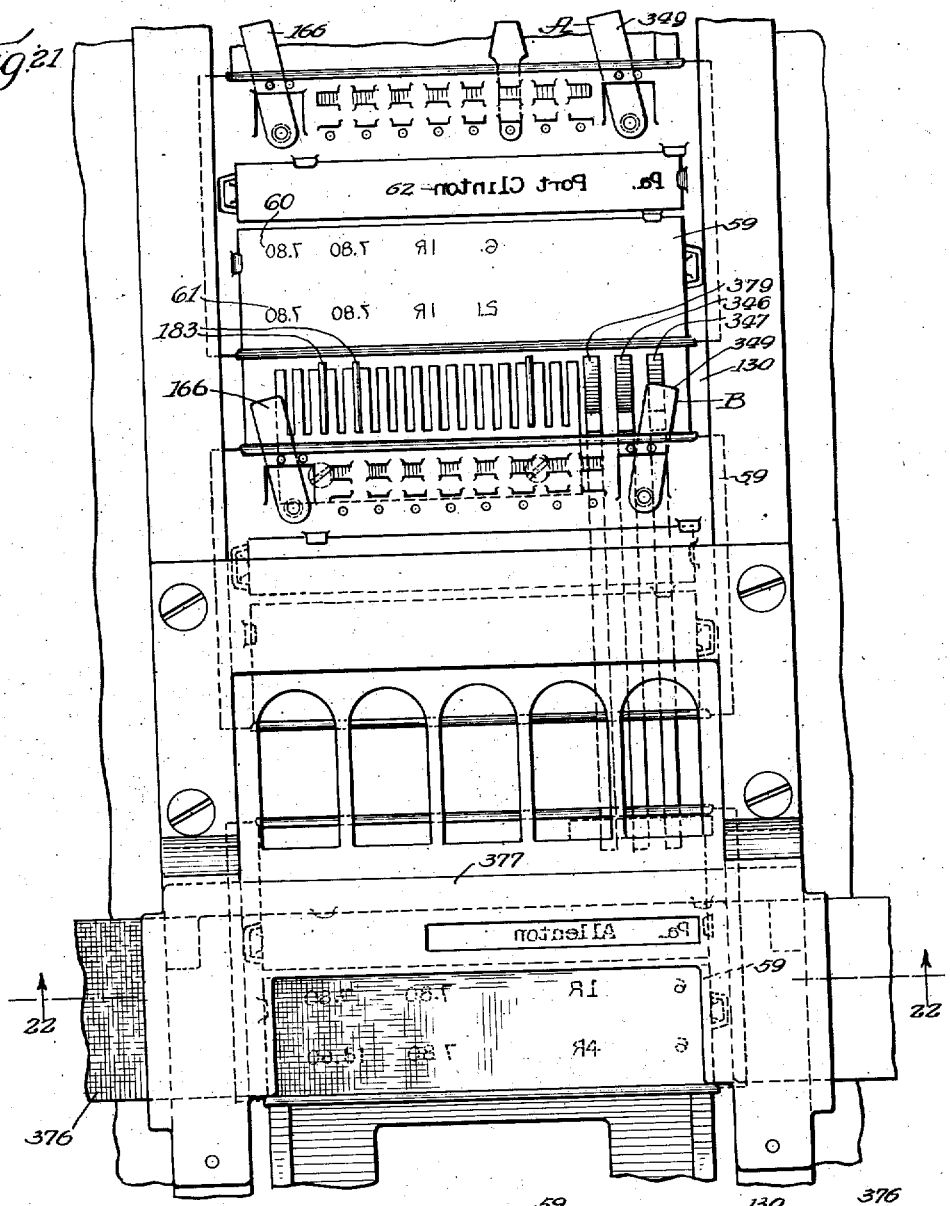
Fig. 21 is a fragmental plan view illustrating the printing devices and the guiding arrangement therefor.

It has been previously pointed out that the indicia in either the row 60 or 61 on the printing plates 59, Fig. 21, is intended to be printed in the columns 58 and this is accomplished by shifting the sheet 29 longitudinally of the machine as well as transversely. This longitudinal shifting is accomplished in the following manner: Depending from the bed plate 3 is a bearing 303, Figs. 6 and 18, in which a shaft 304, Fig. 19, is journaled. Secured to the lower end of the shaft 304 is an arm 305 and secured to the upper end of said shaft is a substantially channel-shaped guiding member 306. On the block 241' is a swivel pin 310, Fig. 3, which is engaged by the bifurcated end portion 311 of the arm 312. The end of the arm 312 opposite the bifurcation 311 is pivotally connected, as indicated at 313, to the arm 314 on the casting 32. Rotatably mounted at substantially the medial portion of the arm 312 is a roller 315, which roller 315 is adapted to travel in the guiding member 306. Depending from the bed plate 3 is a rib 316, Figs. 6 and 18, on which a stud 317 is mounted which has a bifurcated end portion in which the medial portion of a lever 318, Figs. 6 and 19, is pivotally mounted. The link 319 has opposite ends thereof connected to free ends of the link 318 and the arm 305. Extended through the shaft 163 is a shaft 320, Figs. 1, 14 and 19, carrying at one end an arm 321, Figs. 1 and 19. A link 322 interconnects the lever 318 and the arm 321. On the end of the shaft 320, opposite the arm 321, is an arm 323, Figs. 14 and 19, carrying the stud 324 that has a substantially triangularly-shaped end portion 325 which is adapted to be selectively seated in one of the teeth on the dog 326, this seating being brought about in a manner to be described presently. Inasmuch as the shaft 320 and the arm 305 are interconnected in the manner above set forth, said arm 305 is disposed in different angular positions in accordance with the seating of the end portion 325 in one of the teeth on the dog 326. If, for example, the end portion 325 is seated in the first of the notches in the dog 326, the arm 305 is disposed in the angular position illustrated in Fig. 18.

On the dog 326 is a crank-shaped arm 326', Fig. 15. Extending upwardly from the frame is a pin 327' which provides a stop for the end portion 330' of the arm 326' and hence for the dog 326 when in its lowest position. A flat spring 328', Fig. 14, extends forwardly from the arm 201 and bears on the portion 330' under conditions to be set forth hereinafter. A tooth 327, Figs. 18 and 19, is provided on the end of the arm 305, opposite the connection to the link 319. An arm 328, pivotally mounted on the frame as indicated at 329, has notches 330, 331 and 332, provided therein, the number of notches in the arm 328 being equal to the number of teeth on the dog 326. A pivotally mounted arm 333, Fig. 18, carries a roller 334, and a suitable yieldable connection 335 is provided between the arms 328 and 333. In the disk 278 two notches 336 and 337 are provided which are disposed in diametrical relation and, as illustrated in Fig. 18, the notch 337 is deeper than the notch 336. The compression spring in the connection 335 urges the roller 334 toward and into these notches. Extending between the lever 305' and the arm 328 is a spring 335' tending to move the arm 328 in a counter-clockwise direction, as viewed in Fig. 18, which spring is weaker than the spring in the connection 335. The angular relation between the arm 328 and the arm 333 is determined by the compression spring in the connection 335, lock nuts being provided at opposite ends of the bolt on which said spring is mounted whereby the compression of the spring may be varied at will. The device is so adjusted that when the roller 334 is in the deep notch 337 the tension spring 335' overcomes the compression spring in the connection 335 so that the arm 328 is pulled clear of the tooth 327, but when the roller 334 rides on the periphery of the disk 278 or is in the shallow notch 336 the arm 328 is moved and held to engage and retain the selected notch therein to firmly hold the tooth 327. As shown in Fig. 18 the pawl 277 has just completed its stroke in a clockwise direction and in such position a roller (shown in dotted lines) on the arm carrying the pawl is adapted to bear against the arm 333, to hold the roller 334 disengaged from the notches, until the pawl 277 commences to move in a counter-clockwise direction. The guiding member 306 is thus firmly held during transverse movement of the sheet. When the roller 334 is in the shallow notch 336 or in engagement with the periphery of disk 278 the arm 328 is so disposed that the tooth 327 is seated in one of the notches 330, 331 or 332, depending upon the angular position of the arm 305, and, in this manner, the arm 305 is locked against movement. When the arm 305 is moved into angular position, as above set forth, the guiding member 306 is also moved into an angular position. Therefore, when the lister is moved from the position illustrated in Fig. 2 toward the right in said view, by the movement of the slide 288 that is actuated by the rod 286, the roller 315 travels through the guide 306 and, depending upon the angularity of the guide 306, the casting 307, the racks, and the portions of the lister connected thereto are moved longitudinally and the difference in angularity of the guide 306 serves to aline the paper to be printed with either the type in the row 60 or the row 61. The racks are moved, as above stated, by reason of the connection of arm 312 to the block 241'.

The block 241′ is connected to the racks as heretofore described and as shown in Fig. 10.

To print from either the row 60 or 61 on the printing device, the sheet is not only shifted, as just described, but also a selected one of the platens is employed. Mounted in the bracket 31 is a plunger 342 having a roller 339, Figs. 3 and 6, at the upper end thereof. On the shaft 101 is a cam plate 338 which lies in the path of the roller 339 to be engaged thereby. When the angularity of the guide 306 is such that the printing operation is to be performed from the type in the upper row 60, the rack 239 is not moved in an amount as great as when the printing is to be carried out from the lower row of type 61. A slot 340, Fig. 6, is provided in the rack 239. The plunger 342 is journaled in a bearing 341 on the bracket 31 and a recess 343, Fig. 9, is formed in the plunger. A roller 344, carried by the plunger, is arranged in the recess 343 and in the recess 340. The recess 340 has a rise 345 at one end thereof and the roller 344 is urged toward the bottom of the recess by the spring 344′, Figs. 3 and 6. When the rack 239 is moved the lesser amount, determined by the setting of the guide 306, the rise 345 of the recess 340 is not engaged by the roller 344 and when the lister moves to the right in Fig. 2, during such a time, the roller 339 engages the cam plate 338 to elevate the cam plate only in a certain amount and the rod 101 is rotated in a limited amount. The rotation imparted to the rod 101 is sufficient to cause the arm 100, connected thereto, to be moved in an amount which alines the rod 97 with the stud 104. If, however, the rack 239 is moved in the greater amount as determined by the setting of the guide 306, the roller 344 travels up the rise 345 and elevates the plunger 342 and roller 339 so that greater movement is imparted to the cam plate 338 and, therefore, the rod 101 is rotated in an amount sufficient to aline the rod 98 with the stud 104. When the stud 104 pushes either the rod 97 or 98 the platen, controlled by the rod so moved, is released to bring about the printing operation.

In order to determine whether the printing operation shall be performed from the row 60 or the row 61 the following arrangement is provided: As best illustrated in Figs. 11 and 19, pawls 346 and 347 are pivotally mounted on shaft 348 carried at the rear edge of the printing bed 131. These pawls are disposed below the printing devices 59 traveling along the guideway 130. On the printing devices 59 so-called switch tabs 349 are provided which are movable into either the position A or the position B, Fig. 21. When disposed in position A the tabs are alined with the pawl 346, and when disposed in position B they are alined with pawl 347. Supported in the frame is a shaft 350, Figs. 14 and 19, and the dog 326 is carried by this shaft. A block 351, pivotally mounted on shaft 350, is bifurcated as indicated at 352. A pin 353, carried by shaft 350, extends into the bifurcation 352. A pin 354 is mounted on the block 351. A heavy spring 355 extends between the upper ends of the pins 353 and 354 and tends to turn the block 351 about the shaft 350 to engage the end of the bifurcation 352 with the pin 353 to limit the turning movement of the block 351. Elongated pins 356 and 357 extend upwardly from the block 351 and terminate below the pawls 347 and 346, respectively, the pin 356 being longer than the pin 357. The printing device 59 disposed above the printing bed 131, Fig. 11, is in printing position. The printing device juxtaposed to but rearwardly of the printing device in printing position is disposed in selector position and the switch tab 349 of the printing device in selector position may be arranged to engage the free end of either the pawl 346 or 347. In Fig. 19 the printing device 59 in selector position has the tab 349 thereof disposed in position B and, therefore, this tab engages and depresses the pawl 347 which imparts downward movement to the pin to pivot the block 351 about the shaft 350, stretching the spring 355. If the switch tab were in position A the pawl 346 would be engaged and depressed and the pin 357 would be moved downwardly to pivot the block 351. Inasmuch as the pin 356 is of greater length than the pin 357, it is manifest that the spring 355 is stretched more than when the pin 357 moves the block. A light spring 358, Figs. 14 and 19, extends between the frame and the dog 326 and normally tends to urge this dog downwardly. Mounted on the shaft 138, to be movable therewith, is an arm 359, Fig. 14, having a block 360 mounted adjacent the outer end thereof, and pivotally mounted at the outer end of the arm 359 is a pawl 361. A spring 362 extends between the block 360 and one end of the pawl 361 and urges the other end of the pawl into engagement with the end of the set screw 363. Therefore, by adjusting the position of the screw 363 the position of the nose 364 of the pawl 361 may be varied. On the arm 323 is a lug 365 having a toe portion 366. When the shaft 138 is moved, in the manner previously described, the arm 359 is moved upwardly or in a counter-clockwise direction, and the pawl 361 is similarly moved thus bringing the nose 364 thereof into engagement with the toe portion 366 to move the arm 323 in a clockwise direction, as viewed in Fig. 14. Movement of the arm 323 in this direction unseats the triangular end portion 325 of the boss 324 from the tooth of the dog 326 in which it has been seated. The notches in the dog 326 are indicated by 367, 368 and 369. If the printing operation is to be performed from the row 61 the tab 349 is disposed in the position B and, therefore, the shaft 350 is rotated in the greater amount, as has been previously set forth. Since the dog 326 is connected to the shaft 350 this dog is moved upwardly when the shaft is rotated. Following the upward movement of the dog 326 the nose 364 disengages the toe portion 366 and releases the arm 323. The spring 370 acts on the arm 323 to move said arm toward the dog 326. If the dog 326 has been moved into its upper position the triangular end portion 325 seats in the notch 367 and, therefore, the shaft 320 is rotated but slightly. Rotation of the shaft 320 is transmitted through the arm 321, link 322, lever 318, and link 319, to arm 305. When the arm is positioned in this manner the tooth 327 enters the notch 330 and the guide member 306 is disposed in its greatest angular inclination. In the event the tab 349 is in the position A the shaft 350 is not rotated in as great an amount as that just described and, therefore, the dog 326 is not moved upwardly in as great an amount. In this instance, the triangular end portion 325 seats in the notch 368 and greater movement is imparted to the shaft 320. Therefore, the arm 305 is so disposed that the tooth 327 enters the notch 331 and the guide member 306 is disposed in an angular position but the angularity thereof is less than the angularity previously set forth. In the event the printing device in printing position has no switch tab 349 the shaft 350 is not rotated to move the dog 326 upwardly and, therefore, the triangular end portion 325 is seated in the notch 369 as shown in Fig. 14. In this instance the tooth 327 enters the notch 332 and the guide member 306 is held in a position substantially transversely of the machine, as illustrated in Fig. 3.

When the triangular end portion is disposed in the notch 369 it is desirable that the advancing movement of the printing devices 59 be interrupted and this is accomplished in the following manner: pivotally mounted on the shaft 149 is a cam plate 371, Figs. 14 and 15. A link 372 interconnects the arm 323 and the cam plate 371. On the cam plate 371 are cam surfaces 373 and 374. When the triangular end portion 325 is disposed in either the notch 367 or 368 the link 372 positions the cam plate 371 so that the surface 374 will be disposed in engagement with the pin 375 on the pawl 164 which permits the end of the pawl 164 to seat in the teeth of the ratchet 147 thus causing the advancing movement of the ratchet. However, when the arm 323 is disposed in the position illustrated in Fig. 14 the rod 372 moves the cam plate 371 to position the cam surface 373 in engagement with the pin 375 which holds the end of the pawl 164 from engagement with the teeth of the ratchet 147, and when this ratchet is moved, in the manner described, the action is merely oscillatory rather than advancing.

As best illustrated in Fig. 22, a ribbon 376 is directed across the machine above the printing device 59 in printing position, that is, the printing device rested upon the anvil 131. A suitable shield 377, of the character well understood in the art, is arranged over the ribbon and the sheet 29 moves into position over this shield. When the platens are released, in the manner previously described, and portions thereof strike the sheet to force the sheet toward the printing device, a printing operation results as the ribbon 376 is disposed between the sheet and printing device.

After an impression has been made from a printing device in printing position the succeeding printing device is moved into printing position and the first printing device moves over the guide means 378, Fig. 11 which directs the printing device to suitable means for positioning the printing devices in a storage member.

Figure 26:
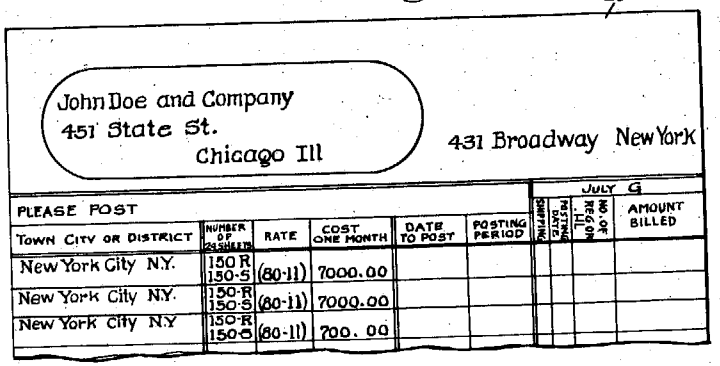
Figs. 25 and 26 are fragmental views illustrating different types of sheets printed in the machine.

The machine is sometimes used to operate on sheets such as 29b, Fig. 26, wherein the heading at the top of the sheet is filled in prior to the time the other data is printed. When a printing device having printing characters for that purpose thereon is moved into printing position, it is desirable to interrupt operation of the machine until the impressions have been taken therefrom, and one mechanism for accomplishing this will now be described. As best illustrated in Fig. 21, a pawl 379 is arranged adjacent the pawls 346 and 347. Alined with the pawl 379 is a rod 380, Figs. 11 and 15, that is connected to the movable portion 381 of the switch structure 382. When a tab, similar to the tab 166, engages the pawl 379 the rod 380 is moved downwardly to close the switch 382. Another switch 383, Fig. 20, is mounted on the frame and this switch includes a movable portion 384 that is connected by a rod 385 to the end of the cam member 172, and when this cam member 172 is moved, in the manner previously described, the portion 384 is moved downwardly to close the switch 383. As will be explained hereinafter, this electrical arrangement controls devices which enable manual operation of the platens. In order to perform the manual printing operation from a printing device of the character described, to fill in the heading on the sheet 29b, the platens are manually released. On the arms 93, 94 and 95, are end portions 386, 387 and 388, which are depressed to perform this manual printing.

Another manual arrangement is provided which may be used to prevent automatic releasing of the platens at any desired time and this arrangement includes the rod 389, Fig. 14, having one end portion mounted in the block 112 and having a knob 390 at the other end thereof. When the knob 390 is pushed inwardly, the opposite end of the rod 389 engages the pawl 114 and pivots this pawl to compress the spring 116 and thus the nose portion 117 is moved from alinement with the lug 118 and in this manner a printing operation is prevented.

A handle H is connected to the sleeve 102 and by grasping this handle, the arm 122 may be manually moved upwardly to restore the released platens in the same manner as the platens are automatically restored upon automatic operation of the arm 122.

To fill in the heading on the sheet 29b it is necessary that the lister be arranged for free movement and this is accomplished by disconnecting the lister slide 33 from the racks 239 and 240, and by disconnecting the bracket 32 from the slide 288. A stud shaft 255′ has a handle 256′, Fig. 4, thereon, and connected to the handle is a cam plate 257′ having a cam surface 258′, Fig. 3, thereon. On the collar 258 is a pin 260′ which bears against the cam surface 258′. When the handle 256′ is rotated the rise on the cam surface 258′ moves the pin 260′ to turn the collar 258 and consequently the rod 255. When the rod 255 is rotated, in a counter-clockwise direction as viewed in Fig. 4, in this manner, the pawls 246 and 248 are moved from engagement with the racks 239 and 240 by the arm 260. As illustrated in Fig. 7, the end of arm 256 is disposed below a shoulder on the pin 292 and, therefore, when the rod 255 is rotated in the counter-clockwise direction set forth the pin 256 raises the pin 292 to retract the lower end thereof from the recess 295. Therefore, the lister slide, and consequently the sheet 29, may be moved either transversely or longitudinally of the machine to aline different sections of the sheet 29 with different superimposed rows of characters on the printing device 59.

It has been set forth that the lister slide 33 is moved along the tubular support 30 with a step-by-step movement to bring about spacing between transverse lines on the sheets 29. Suitable means are provided for indicating when the bottom of the sheet 29 is reached to prevent further printing operations until a new sheet has been installed and the lister repositioned. Such means include the switch structure, generally indicated by 391, Fig. 3. As the lister moves along with a step-by-step movement toward the switch 391 the end of the lister will eventually engage the arm 392 of the switch and move this arm so that the notch 393 therein engages the pin 394 and, when this engagement is brought about, circuit through the switch 391 is closed. The rod 395 is provided which may be manually operated to operate the switch 391.

In order that the operator of the device may be informed whether the lister switch 391 or the selector switch 382 has interrupted operation of the machine indicating signals, such as the lamps 396 and 397, are provided which are arranged in series with the switches, the lamp 396 being in series with the selector switch 382, while the lamp 397 is in series with the lister switch 391. The operation of this arrangement is described hereinafter.

The electrical connections employed in the device, in addition to those previously described, are as follows: a conductor 398 interconnects one terminal of the motor 5 with the main conductor 20 and the conductor 399 interconnects the other terminal of the motor and the main conductor 21, the conductor 399 being connected behind the switch 22. Therefore, closing of the switch 22 sets the motor 5 in operation. In the manner previously described, the push button switch 19 may be closed to energize the solenoid 17 to set the machine in operation and, in the manner set forth, the lever 15 is held in position until the latch 218, Fig. 24, is moved from retaining position which, as has been described, may be brought about by the exhausting of the supply of printing devices 59 in the magazine 129, or by the energizing of the magnet 229. The magnet 229 may be energized either by closing the selector switch 382 and the timing switch 383, or by closing the lister switch 391, or by closing the stop switch 400, Fig. 27, which may be located at any desired place on the machine. If, for example, the switch 400 is closed, a circuit is closed from the conductor 20, through the conductor 401, switch 400, conductor 402, conductor 403, filament of lamp 397, conductor 405, through magnet 229 and conductor 406 to main conductor 21. If the lister switch 391 is closed, a similar circuit is closed except that, in this instance, current flows from the conductor 20 through conductor 407 and switch 391 to conductor 403. For a purpose which will be made apparent hereinafter, it is desirable that the magnet 229 not be energized at the time the selector switch 382 is closed and therefore, the switches 383 and 382 are connected in series. A conductor 409 interconnects the switches 383 and 382. A conductor 408 interconnects the main conductor 20 and the switch 383. Conductors 410 and 411 interconnect the filament of lamp 396 with the selector switch 382 and the conductor 405, respectively. Therefore, when both switches 383 and 382 are closed the magnet 229 will be energized which interrupts operation of the machine.

The operation of the machine is as follows: the sheet 29*a*, depicted in Fig. 25, is intended to have the row or group of characters 62 on the printing device 59 printed in the column 57 and to have either the row or group of characters 60 or 61 printed in the column 58 in transverse alinement with the characters printed from the row 62. A sheet, such as 29*a*, is clamped in position, as illustrated in Figs. 3, 4 and 5, with the first line thereon at a printing position in the machine. The machine is then set in operation by first closing the switch 22, which sets the motor 5 in the operation. Switch 19 is then closed and printing devices 59, which have previously been stored in the magazine 129, are withdrawn from the magazine and fed along the guideway 130. When the machine is first set in operation there is no printing device in selector position and, therefore, neither the pawl 346 or 347 is depressed and the triangular end portion 325 therefore seats in the notch 369 which retracts the pawl 164 from engagement with the teeth of the ratchet 147. Therefore, as the main operating member 26 is motivated, the ratchet 147 is merely oscillated and during this time the end portion 154 is seated in the deep notch 150 and the trigger 143 remains in engagement with the notched end 142 and the bars 132 are operated upon each complete oscillation or reciprocation of the main operating member 26. When, however, a printing device 59, having a tab 349 thereon, moves into selector position, either the pawl 346 or 347 is depressed. If, for example, the tab 349 is in position B the pawl 347 is depressed, causing the triangular end portion 325 to seat in the notch 367, to dispose the tooth 327 in the notch 330 to lock the guide member 306 in its greatest angular inclination.

After the selector has operated, the printing device on which the selector has acted moves into printing position and following the time the guide member 306 is locked in position, the pawl 277 seats in the notch 280 and is moving the disk 278, and consequently the disk 282 and the link 286 move the slide 288. This movement of the slide 288 shifts the lister to the right, as viewed in Fig. 2, and since the guide member 306 is in its greatest angular position, the roller 315 travels therethrough and acts through the arm 312 to longitudinally move the racks 239 and 240 and the lister slide 33. Since the lister is moving to the right at the same time the roller 315 is traveling through the guide member 306 it is apparent that the sheet 29*a* is moved diagonally and, inasmuch as the guide member 306 is in its greatest angular position, the column 58 on the sheet 29*a* is moved into alinement with the group of characters 61 on the printing device 59 at printing position. A new cycle of operation of the machine starts at this time.

During the first portion of movement of the main operating member 26, which is in a counterclockwise direction, as viewed in Fig. 1, movement is transmitted through the arm 74 to the link 73 and the arm 79 is moved in a clockwise direction, as viewed in Fig. 14. During the movement of the lister slide to the right the cam plate 338 is engaged by the roller 339 and the shaft 101 is turned to move the bracket 100 to aline the push rod 98 with the stud 104. Therefore, when the arm 79 actuates the pawl 114 to move the bell crank 106 the push rod 98, arm 95, and the shaft 92 are moved. This retracts the pawl 89 from the notch in the platen slide 82 and the spring 85 causes this platen slide to be snapped downwardly and the platen 119 at the lower end of the platen slide 82 forces the sheet 29*a* toward the group of characters 61 and, by reason of the disposition of the ribbon 376 between the sheet and the characters, a printing impression is made on the sheet. After the platen slide 82 has dropped, the main operating member 26 continues to move in the direction in which it has been moving the arm 122 to restore the platen slide 82 to cocked position. Subsequent to this, the main operating member moves in the opposite direction and so positions the parts that the pawl 89 reenters the notch in the slide to retain the slide 82 in cocked position.

If the pawl 346 had been depressed the angularity of the guide member 306 would have been less and the sheet 29*a* would not have been moved longitudinally in as great an amount. Therefore, the portion of the sheet to be printed would have been alined with the group of characters 60, and in this instance, the shaft 101 would have been rotated sufficiently to move the bracket 100 to aline the push rod 97 with the stud 104. Therefore, the arm 94 and shaft 91 would have been moved and the pawl 88 would have been retracted from the notch in the platen slide 81 and the spring 84 would have moved this platen slide downwardly to perform the printing operation.

After the selection is made on the first of the series of printing devices and the feed bars 132 operate to move different printing devices into printing position, the cam surface 373 is withdrawn from engagement with the pin 375 in the manner described whereupon the pawl 164 is permitted to reengage the teeth of the ratchet 147. Consequently, during the operation in which the first of the series of printing devices is moved from selector position into printing position, the ratchet 147 is operated so that the member 154 seats in a shallow notch 151. Consequently, during the cycle of operation of the main operating member 26, which operates the platens so that an impression is made either from the row 60 or 61, the push rod 148 engages the trigger 143 so as to disengage it from the notch 142 and therefore during this cycle of operation the feed bars 132 are not operated. However, during the cycle of operation in which an impression is made from either the row of type characters 60 or 61, the ratchet 147 is advanced one step and consequently during the cycle of operation of the main operating member 26 subsequent to that operation in which an impression is made either from the row 60 or 61, the push rod 148 is retracted so that the trigger 143 seats in the notch 142 and therefore the feed bars 132 are operated in this cycle of operation. On the first cycle of operation for each printing device fed into printing position from which an impression is to be made, the bell crank 140 and the shaft 138 are not moved, but on the next operation of member 26 these parts are actuated.

During the time the main operating member 26 moved in a counter-clockwise direction, to cause the releasing of the platen slide 81 or 82, the pawl 277 moves in a clockwise direction, from the notch 281 toward the notch 280. Then at the time the main operating member 26 starts to move in the clockwise direction the pawl 277 is seated in the notch 280 and, therefore, since the pawl 277 is now moved in a counter-clockwise direction, the notch 280 is moved from the position of the notch depicted in Fig. 18 into the position in which the notch 281 is shown in Fig. 18. During this time the disk 282 is turned to cause the link 286 to move the slide 288 toward the left, as viewed in Fig. 2. As the slide 288 moves toward the left the sheet 29 again moves diagonally and the column 57 thereon is alined with the printing device 59. When the sheet moves to the left it is so disposed that, upon the next printing operation, which occurs upon the next operation of the member 26, the characters in the group 62 are printed in the column 57 in transverse alinement with the previously printed characters in the column 58. Upon this second operation of the main operating member 26 the shaft 101 is not rotated and, therefore, the push rod 96 is alined with the stud 104. When the stud 104 moves this push rod the pawl 87 is retracted from the notch in the platen slide 80 and the spring 83 snaps this platen slide downwardly to perform the printing operation. Subsequent to the dropping of this platen slide, it is restored to cocked position in the manner previously described. When the arm 79 moved to release either the platen slide 81 or 82 the arm 235 was also operated as was the roller 234, but at this time the rack 240 was not alined with this roller. When the platen slide 80 is released, the arm 235 causes operation of the roller 234 and the rack 240 is moved to compress the spring 245 for at this time the lister has so shifted that the rack 240 is alined with the roller 234, said roller 234 remaining in engagement with the end portion 345 to retain the rack 240 in this position. When the notch 281 moved into the last described position, the deep notch 337 was moved into alinement with the roller 334. Therefore, when the main operating member 26 moved, for the second time, in a counter-clockwise direction the roller 334 was forced into the deep notch 337 and the arm 328 was moved to disengage the notch 330 or 331 from the tooth 327. Also during the counter-clockwise movement of the main operating member 26 the selector mechanisms controlled by the tab 349 operate to depress either the pawl 346 or 347 and stretch the spring 355. Since the end portion 154 is seated in a deep notch 150 the bell crank 140 operates and, on the counter-clockwise movement of the main operating member 26, the bar 132 moves rearwardly. Since the bell crank 140 is moved it is manifest that the shaft 138 is moved and, therefore, the pawl 361 is moved upwardly and the nose 364 engages the toe portion 366 to bring about the repositioning of the triangular end portion 325. During the time the main operating member 26 is moved in the counter-clockwise direction for the second time, the pawl 277 is moving clockwise from the notch 280 toward the notch 281. When the pawl 277 is seated in notch 281 and when the pawl is moved counter-clockwise the roller 334 is removed from the deep notch 337 and the tooth 327 reseats in a notch 330 or 331. At the time the triangular end portion 325 seated in the notch, the guide member 306 was positioned. When the main operating member 26 starts to move in a clockwise direction the lister starts to move toward the right. As soon as the lister starts to move toward the right, the end portion 243 disengages the roller 234, and, therefore, the lister spaces in the manner previously described. During this same time the bar 132 moves forwardly and ejects the printing device from which impressions were previously made and positions the succeeding printing device, on which the selector mechanisms have acted, in printing position, and also, another printing device is moved into selector position. Since the lister has spaced longitudinally, it is apparent that the sheet 29 is arranged to receive impressions in another line below the line in which the impressions have been previously made. Therefore, upon the next movement of the main operating member 26 in a counter-clockwise direction, which will be the start of a new cycle of operation, either the platen slide 81 or 82 is released and the subsequent operations are carried out in the manner previously described. The foregoing operations continue under normal conditions until the lister slide 33 has spaced a sufficient number of times to bring about the closing of the lister switch 391. Closing of this lister switch 391 releases the latch 218 and interrupts operation of the machine.

If, for example, it is desirable to interrupt operation of the machine prior to the time the bottom of the sheet 29 is reached, and at the time a predetermined printing device moves into printing position, a tab may be disposed in position to engage the pawl 379 and when such a tab engages the pawl the switch 382 is closed. However, the switch 382 closes at the time the printing devices are being advanced, and it is not desirable to stop the machine at this time.

To prevent this, the switches 382 and 383 are connected in series. Since the switch 383 is operated from the cam member 172, it is manifest that the switch 383 is not closed to complete the circuit until both printing operations have been performed, from the printing device newly moved into printing position, as the member 172 does not operate until this time. At the time the printing devices 59 are being advanced, the end portion 154 moves from a deep notch 150 into a shallow notch 151 and, therefore, operation of the bell crank is prevented upon the subsequent complete operation of the main operating member 26, which is the first operation in a complete cycle of the machine.

If it were desired to skip one of the printing devices 59, a tab 166 would be provided, which would be disposed in selector position, and, when this tab would prevent upward movement of member 169 the pin 202 would be prevented from passing into the pocket 197. Therefore, the arm 205 would be held in the upper position and the roller 80' would be disposed on the rise 84, disengaging the end of the pawl 77' from the hardened portion 78' and the arm 76 and the platens would not be operated. Further, when the main operating member 26 moves counter-clockwise and the end portion 325 is in the notch 367, thus disposing the tooth 327 in the notch 330, the lever 305' is engaged by the lever 305. The lever 305' then reengages the tail portion 290' to unseat the pawl 277 which, therefore, does not engage a different notch. However, the link 147' is operated to rock the rocker 158. This causes the bracket 152 to be moved downwardly and thus the ratchet 147 is motivated. This operation of the bracket 152, and the simultaneous operation of the arm 201, occur prior to the time the shaft 138 is moved sufficiently to engage the nose 364 with the toe portion 366. Therefore, the flat spring 328', on the arm 201, seats on the portion 330', which is moved into engagement with the pin 327 and the triangular end portion 325 seats in the notch 369. Therefore, the cam surface 373 is moved into engagement with the pin 375 and the pawl 164 is moved from retaining position and the ratchet 147 is not advanced. From this it is apparent that all parts remain in an unchanged position and on the next operation of the main operating member 26 another printing device is advanced into selector position. If this new printing device has a tab 166, disposed in selector position, thereon the foregoing skipping operation is repeated, but if this printing device does not have a tab 166, so located, the parts function in the manner previously described, that is to say, two impressions are made from this printing device and the lister spaces longitudinally, once for the two impressions, and shifts transversely for each impression, this transverse shifting locating the column 58 on the sheet in printing position and arranging the sheet to receive an impression from either the row 60 or 61, depending upon the position of the tab 349.

In the printing of sheets, such as are shown in Fig. 26, indicated by 29b, it is desirable that the information at the top of the page be filled in before the subsequent printing operations be performed. Usually a special printing device is provided having characters thereon providing the information to be imprinted at the top of the sheet 29b. Such a printing device is provided with a tab to depress the pawl 379. Therefore, the selector switch 382 is closed and when the timing switch 383 is closed operation of the machine is interrupted and the lamp 396 is illuminated. It is apparent that when the switch 391 or the push button switch 400 are employed to interrupt operation of the machine the lamp 397 is illuminated. After the timing switch 383 has closed, and operation of the machine interrupted, the handle 256' is turned to move the pin 260' and, therefore, the lister is freed from the racks 239 and 240, and from the slide 288. Therefore, the sheet may be moved into any desired position and, by depressing the end portions 386, 387 and 388, the platens may be manually released to perform printing operations and the handle connected to the sleeve 102 may be employed to reposition the platens after being thus released.

In a machine, as described, the printing devices 59 have had three groups of printing characters thereon, the term groups being used in place of the term lines as it may sometimes happen that more than one line is printed. Since three groups of printing characters are provided on the printing devices the platen structure embodies three platen members and, when one of the printing devices is in printing position, these platen members are respectively alined with the groups of characters on the printing devices. Therefore, if a greater or lesser number of groups of printing characters are provided on the printing device, the number of platen members would also be varied. Further, in order to perform the printing operations in a proper sequence and manner the tooth arrangement on the periphery of the ratchet 147 would be varied.

As the column spacing on the sheets may vary, it is desirable that the amount of transverse movement imparted to the lister be capable of variation and this is attained by adjustably mounting the slide 284 in the dovetail groove 283, said slide being locked in position by the set screw shown. Since the slide 284 cooperates with the disk 282 and the connecting member 285 to provide a crank action, it is manifest that a diametrical variation in the position of the connecting member 285 varies the amount of movement imparted to the link 286 and, therefore, to the slide 288 and the lister structure.

It is apparent from the foregoing description that I have provided a machine through which a plurality of printing devices may be successively passed. The machine is so arranged that certain of the printing devices may be employed in a printing operation while others may be passed through the machine without such a printing operation being performed. Further, the machine is so arranged that the printing characters on the printing devices, which are arranged in superimposed groups, may be printed on the sheet in transverse alinement and certain of the groups of the printing characters may be printed while others may not be printed and suitable means are provided whereby selected groups may be used in the printing operation.

While I have illustrated and described the preferred form of construction for carrying my invention into effect, it is to be understood that this is capable of variation and modification without departing from the purview of the following claims.

I claim:

1. In a printing machine, printing means, a table, a supporting member mounted on said table, sheet clamping means mounted on the supporting member for movement therealong, means for moving the supporting member transversely of the table, a guide member on the table, and means on the supporting member and engaged with the guide member to impart movement to the supporting member longitudinally of the table during transverse movement of the supporting member.

2. In a printing machine, printing means, a table, a supporting member mounted on said table, sheet clamping means mounted on the supporting member for movement therealong, means for moving the supporting member transversely of the table, a grooved guide member on the table, and a member on the supporting member and disposed in said grooved guide member to be movable therealong to impart movement to the supporting member longitudinally of the table during transverse movement of the supporting member.

3. In a printing machine, printing means, a sheet carriage, means for transversely moving the sheet carriage relative to the printing means, other means for simultaneously moving the sheet carriage longitudinally relative to the printing means, and selectively operated means for varying the longitudinal movement.

4. In a printing machine, printing means, means for transversely moving a sheet to be printed relative to the printing means, means for longitudinally moving the sheet during said transverse movement including a guide selectively operated member, means for positioning the guide member, and means for locking the guide member in position.

5. In a printing machine, printing means, a bed, sheet carrying means, said bed having transversely extending guiding means thereon, means guiding the sheet carrying means from the transversely extending guiding means, a crank structure for transversely moving said sheet carrying means, and means for imparting a step-by-step movement to said crank structure.

6. In a printing machine, printing means, sheet carrying means, means for imparting a transverse movement to said sheet carrying means, a guide member, means on said sheet carrying member movable along said guide member whereby said sheet carrying means will be longitudinally positioned during said transverse movement, and means for selectively positioning said guide member.

7. In a printing machine, means for moving printing devices through the machine, printing means, sheet carrying means, means for imparting a transverse movement to said sheet carrying means, a guide member, means on said sheet carrying member movable along said guide member whereby said sheet carrying member will be longitudinally positioned during said transverse movement, means for positioning said guide member, and means controlled by means on the printing devices for regulating said positioning means.

8. In a printing machine, printing means, a sheet carriage, means for simultaneously imparting transverse and longitudinal movement to the sheet carriage to aline transversely alined sections of a sheet in the sheet carriage with the printing means, and means for advancing the sheet carriage to move the sheet past the printing means.

9. In a printing machine, printing means, a sheet carriage, means for transversely moving the sheet carriage to move a sheet therein relative to the printing means, means for simultaneously moving the sheet carriage and said sheet longitudinally relative to the printing means, and means for advancing the sheet carriage to move said sheet in a step-by-step manner past the printing means.

10. In a printing machine, a printing device having separate groups of printing characters thereon, fixed printing means including movable parts respectively alined with the groups of printing characters, means for operating one of said parts to print the group of printing characters alined therewith on a determined portion of a sheet, means for moving the sheet to locate a portion thereof alined with said determined portion in position to receive an impression from another group of printing characters, and means for operating the movable part alined with this last group of printing characters to print said characters on said sheet.

11. In a printing machine, a printing device having separate groups of printing characters thereon, fixed printing means including movable parts respectively alined with the groups of printing characters, means for operating one of said parts to print the group of printing characters alined therewith on a determined portion of a sheet, means for diagonally moving the sheet to locate a portion thereof transversely alined with said determined portion in position to receive an impression from another group of printing characters, and means for operating the movable part alined with this last group of printing characters to print said characters on said sheet.

12. In a printing machine, means for moving a printing device having separate groups of printing characters thereon into printing position, fixed printing means including movable parts disposed at printing position and respectively alined with the groups of printing characters, means for operating one of said parts to print the group of printing characters alined therewith on a determined portion of a sheet, means for diagonally moving the sheet to locate a portion thereof transversely alined with said determined portion in position to receive an impression from another group of printing characters, and means for operating the movable part alined with this last group of printing characters to print said characters on said sheet.

13. In a printing machine, means for moving a series of printing devices having groups of printing characters thereon through printing position in the machine in a step-by-step manner, fixed printing means including movable parts respectively alined with the groups of printing characters on the printing device at printing position, means for operating one of said parts during and at rest interval in said step-by-step movement to print the group of printing characters alined therewith on a determined portion of a sheet, means for moving the sheet during an at rest interval in said step-by-step movement to locate a portion thereof transversely alined with said determined portion in position to receive an impression from another group of printing characters, and means for operating the movable part alined with this last group of printing characters to print said characters on said sheet.

14. In a printing machine, a printing device having at least three separate groups of printing characters thereon, fixed printing means including movable parts respectively alined with the groups of printing characters, means for operating one of said parts to print the group of printing characters alined therewith on a predetermined portion of a sheet, means for selectively moving the sheet to locate a portion thereof alined with said determined portion in position to receive an impression from another group of printing characters, and selective means for selectively operating the movable parts alined with these last groups of printing characters to selectively print said characters on said sheet.

15. In a printing machine, means for moving a printing device having at least three groups of printing characters thereon into printing position, fixed printing means including movable parts disposed at printing position and respectively alined with the groups of printing characters, means for operating one of said parts to print the group of printing characters alined therewith on a predetermined portion of a sheet, selective means for imparting diagonal movement to the sheet to locate a portion thereof transversely alined with said predetermined portion in position to receive an impression from another group of printing characters, and selective means for selectively operating the movable parts alined with these last groups of printing characters to selectively print said characters on said sheet.

16. In a printing machine, means for moving a printing device having at least three groups of printing characters thereon into printing position, fixed printing means including movable parts disposed at printing position and respectively alined with the groups of printing characters, means for operating one of said parts to print the group of printing characters alined therewith on a predetermined portion of a sheet, selective means for imparting diagonal movement to the sheet to locate a portion thereof transversely alined with said predetermined portion in position to receive an impression from another group of printing characters, and selective means regulated by the means selectively imparting diagonal movement to the sheet for selectively operating the movable parts alined with these last groups of printing characters to selectively print said characters on said sheet.

17. In a printing machine, a printing device having separate groups of printing characters thereon, fixed printing means including movable parts respectively alined with the groups of printing characters, means for operating one of said parts to print the group of printing characters alined therewith on a predetermined portion of a sheet, a sheet carriage having said sheet clamped therein, means for moving the sheet carriage to locate a portion of the sheet therein alined with said predetermined portion in position to receive an impression from another group of printing characters, and means controlled by the position of the sheet carriage for operating the movable part alined with this last group of printing characters to print said characters on said sheet.

18. A printing machine including a platen structure adapted to make impressions from a printing device, said platen structure embodying separably operable parts, means urging said parts into printing position, means holding said parts in inoperative position against the action of said urging means, and manually operable means for retracting said holding means independently of each other to effect separate operation of said parts.

19. A printing machine including a platen structure embodying separably operable parts, means holding said parts in an inoperative position, means for retracting said holding means and including manually operable portions, and selectively operated means independent of said manually operable portions for operating said retracting means.

20. A printing machine including a platen structure embodying separably operable parts, means holding said parts in an inoperative position, means for retracting said holding means and including manually operable portions, selectively operated means independent of said manually operable portions for operating said retracting means, and means for restoring said parts to inoperative position after operation of said retracting means by said manually operable portions or said selectively operated means.

21. A printing machine including a platen structure embodying separably operable parts, means urging said parts into printing position, means retaining the parts against the action of the urging means and including manually operable portions, selectively operated means for operating said retracting means independently of said manually operable portions and means for automatically restoring said parts to retained position and including a manually operable portion to permit restoration of said parts independent of the automatic restoration thereof.

22. A platen structure embodying independent parts, means for urging said parts into printing position, means for retaining said parts against the action of said urging means, means for retracting said retaining means, an operating member, and means for selectively positioning said retracting means relative to said operating means whereby said parts may be selectively released from said retaining means.

23. A platen structure embodying independent parts, means for urging said parts into printing position, means for retaining said parts against the action of said urging means, means for retracting said retaining means, an operating member, means for selectively positioning said retracting means relative to said operating means whereby said parts may be selectively released from said retaining means, and means for restoring said parts subsequent to the release thereof.

24. In a printing machine, a platen structure adapted to make impressions from a printing device and including a housing, separably operable parts, resilient means acting on said parts and urging the same into a position extended from said housing, retaining means engaging said parts for holding them in a retracted position relative to said housing, and means for withdrawing said retaining means independently of each other whereby said parts may move independently into said extended position to make impressions from the printing device.

25. In a printing machine, a platen structure adapted to make impressions from a printing device and including a housing, separably operable parts mounted in side-by-side relation in said housing, resilient means acting on said parts and urging the same into a position extended from said housing, retaining means engaging said parts for holding them in a retracted position relative to said housing, means for withdrawing said retaining means independently of each other whereby said parts may be moved independently into said extended position to make impressions from the printing device, and means for automatically restoring said parts to said retracted position to be reengaged by said retaining means after movement of the parts into said extended position.

26. In a printing machine, a platen structure including a housing, separably operable parts mounted in side-by-side relation in said housing, resilient means acting on said parts and urging the same into a position extended from said housing, retaining means engaging said parts for holding them in a retracted position relative to said housing, manually operable portions for withdrawing said retaining means to permit said parts to be moved into said extended position, and manually operable means for restoring said parts into said retracted position in engagement with said retaining means.

27. In a printing machine, a main operating member, means operable from the main operating member for moving printing devices through the machine, a platen embodying separately operable sections, releasing members respectively connected to said platen sections, a platen operating member adapted to be selectively positioned relative to said releasing members, link means for operating said platen operating member from said main operating member, means operable from the main operating member for moving a sheet relative to said printing means, and means controlled from the printing devices for rendering said link means and said sheet moving means inoperable whereby only said printing device moving means will be operated upon operation of said main operating member.

28. In a printing machine, a main operating member, means operable from the main operating member for moving printing devices through the machine, a platen embodying separately operable sections, releasing members respectively connected to said platen sections, a platen operating member adapted to be selectively positioned relative to said releasing members, link means for operating said platen operating member from said main operating member, means operable from the main operating member for moving a sheet relative to said printing means, and means for rendering the printing device moving means inoperative during certain operations of the main operating member.

29. In a printing machine, a main operating member, means operable from the main operating member for moving printing devices through the machine, a platen embodying separately operable sections, releasing members respectively connected to said platen sections, a platen operating member adapted to be selectively positioned relative to said releasing members, link means for operating said platen operating member from said main operating member, means operable from the main operating member for moving a sheet relative to said printing means, means for disconnecting the operating means for said platen operating means from the main operating member, means for disconnecting the sheet moving means from the main operating member, and means operable from means on the printing devices for controlling operation of said disconnecting means.

30. In a printing machine, printing means, means for feeding printing devices having printing characters thereon past said printing means, a lister for moving the sheet relative to said printing means whereby the printing means will print the characters on said printing device on the sheet, means for successively moving said lister longitudinally of the machine, and means for interrupting the operation of said machine when said lister has been successively moved into a predetermined position.

31. In a printing machine, printing means, means for feeding printing devices having printing characters thereon past said printing means, a lister for moving the sheet relative to said printing means whereby the printing means will print the characters on said printing device on the sheet, means for successively moving said lister longitudinally of the machine, means for interrupting the operation of said machine when said lister has been successively moved into a predetermined position, and signal means adapted to be operated when said lister moves into said predetermined position.

32. In a printing machine, driving means, operating means, a clutch between said driving means and said operating means, means for engaging said clutch, means for holding said clutch engaged and including a pivotally mounted member, a latch retaining said pivotally mounted member to maintain said clutch engaged, means including a part operable in each cycle of operation of the machine for disengaging said clutch, means feeding printing devices having identifying means thereon through the machine, means including electrically operated means controlled by the identifying means on the printing devices, and a part operable by said electrically operated means for engaging said latch means with the means operable in each cycle of operation of the machine to disengage said clutch.

33. In a printing machine, driving means, operating means, a clutch between said driving means and said operating means, means for engaging said clutch, means for holding said clutch engaged and including a pivotally mounted member, a latch retaining said pivotally mounted member to maintain said clutch engaged, means including a part operable in each cycle of operation of the machine for disengaging said clutch, means feeding printing devices having identifying means thereon through the machine, an electro-magnet including an armature, means connected to the armature of said electro-magnet for transmitting movement thereof to engage said latch means with the means operable in each cycle of operation of the machine to disengage the clutch when said electro-magnet is energized, and means controlled by the identifying means on the printing devices for regulating the energizing of said electro-magnet.

34. In a printing machine, printing means, a lister comprising a member extending longitudinally in the machine and in the direction of sheet movement and normally located in a predetermined position in the machine, means for simultaneously moving said lister transversely and longitudinally of the machine from said predetermined position, a sheet clamp in said lister and movable along said member in a step-by-step manner and adapted to receive a sheet to be printed, and means for moving the sheet clamp along said member in a step-by-step manner when said lister is located in said predetermined position to thereby advance the sheet through the machine.

35. In a printing machine, printing means, a lister comprising a member extending longitudinally in the machine and in the direction of sheet movement and normally located in a predetermined position in said machine, means for simultaneously moving said lister transversely and longitudinally of the machine from said predetermined position, a sheet clamp in said lister and movable along said member in a step-by-step manner and adapted to receive a sheet to be printed, spacing means associated with said member, and means for operating said spacing means to move the sheet clamp along said member in a step-by-step manner to thereby advance the sheet through the machine when said lister is located in said predetermined position.

36. In a printing machine, a bed, printing means, a lister including a pair of spaced members mounted for movement on said bed, a carrying member mounted in said members for movement therewith, a sheet clamp movably mounted on said carrying member and adapted to receive a sheet, spacing means mounted in said members, means connecting the sheet clamp to said spacing means, and means for moving said spacing means relative to said pair of spaced members to move said sheet clamp along said carrying member to advance a sheet carried by the sheet clamp through the machine.

37. In a printing machine, a bed, printing means, a lister normally positioned in a predetermined location in said machine and including a pair of spaced members movable on said bed, a carrying member mounted in said members for movement therewith, a sheet clamp movably mounted on said carrying member and adapted to receive a sheet, means for moving said lister transversely and longitudinally of the machine from said predetermined position and relative to said printing means, spacing means mounted in said members, means connecting the sheet clamp to said spacing means, and means in said machine and operable on said spacing means when said lister is in said predetermined position to move said spacing means relative to said pair of spaced members to move said sheet clamp along said carrying member to advance a sheet carried by the sheet clamp through the machine.

38. In a printing machine, fixed printing means embodying separately operable sections, a printing device alined with said printing means, a lister for moving a sheet longitudinally through the machine in a step-by-step manner and normally positioning a certain longitudinal portion of the sheet in alinement with said printing means and printing device, and means for operating one of the operable sections of said printing means when said lister is disposed to position said longitudinal portion of said sheet in alinement with said printing device and for operating other sections of said printing means when said lister is moved to aline another longitudinal portion of the sheet with said printing means and printing device.

39. In a printing machine, fixed printing means embodying selectively operable sections, a printing device alined with said printing means, a lister for moving a sheet longitudinally through the machine in a step-by-step manner and normally positioning a certain longitudinal portion of the sheet in alinement with said printing means and printing device, and means for operating one of said operable sections of said printing means when said lister is disposed to position said longitudinal portion of the sheet in alinement with said printing means and for operating a selected of the other sections of other printing means when said lister is moved to aline another longitudinal portion of the sheet with said printing means and printing device.

40. In a printing machine, printing means, a bed, said bed having a transversely extending slot therein, sheet carrying means, a slide mounted in said transversely extending slot, means connecting the sheet carrying member to said slide, a crank structure for moving said slide through said slot, and means for imparting a step-by-step movement to said crank structure.

41. In a printing machine, printing means, a bed, said bed having a transversely extending slot therein, sheet carrying means, a slide mounted in said transversely extending slot, means connecting said sheet carrying means to said slide, a crank, structure for reciprocating said slide in said slot, a rotatable member, means connecting said rotatable member to said crank structure, and means for imparting a step-by-step movement to said rotatable member whereby the step-by-step movement will be imparted to said crank structure, slide, and sheet carrying means.

42. In a printing machine, a main operating member, printing means operable from said main operating member, a bed, said bed having a transversely extending slot therein, sheet carrying means, a slide mounted in said slot, means connecting with sheet carrying means to said slide, a crank structure for reciprocating said slide in said slot, rotatable means for imparting a step-by-step movement to said crank structure, and means for operating said rotatable means from said main operating member.

43. In a printing machine, printing means, means for moving a sheet past said printing means in a step-by-step manner and including a relatively fixed member, a movable member having yieldable means acting thereon, and means for moving said movable member against the action of said yieldable means whereby said movable member is moved relative to said fixed member when said movable member is disengaged from the member moving it against the action of said yieldable means.

44. In a printing machine, printing means, means for moving a sheet past said printing means in a step-by-step manner and including a relatively fixed member having spaced notches therein, a member movable relative to said fixed member and having yieldable means acting thereon to urge said member in one direction, means engageable in said spaced notches for limiting the movement of said relatively movable member, and means in said machine for moving said relatively movable member against the action of said yieldable means whereby when said, relatively movable member is disengaged from said moving means said yieldable means moves said yieldable member a distance equivalent to the spacing of adjacent notches in said fixed member.

45. In a printing machine, printing means, lister means adapted to receive a sheet and embodying means for moving a sheet past said printing means in a step-by-step manner and including a relatively fixed member and a movable member having yieldable means acting thereon, means for moving said movable member against the action of said yieldable means whereby said movable member is moved relative to said fixed member when said movable member is disengaged from the member moving it against the action of said yieldable means, and means for moving said lister means relative to said printing means to move the sheet diagonally of the step-by-step movement imparted thereto.

46. In a printing machine, printing means, lister means adapted to receive a sheet and embodying means for moving a sheet past said printing means in a step-by-step manner and including a relatively fixed member having spaced notches therein and a member movable relative to said fixed member and having yieldable means acting thereon to urge said member in one direction, means engageable in said spaced notches for limiting the movement of said relatively movable member, means in the machine for moving said relatively movable member against the action of said yieldable means whereby when said relatively movable member is disengaged from said moving means said yieldable means moves said yieldable member a distance equivalent to the spacing of adjacent notches in said fixed member, and means for moving said lister means relative to said printing means to move the sheet diagonally of the step-by-step movement imparted thereto.

47. In a printing machine, printing means, a lister for moving a sheet past said printing means, in a step-by-step manner and including a relatively fixed member, a movable member having yieldable means acting thereon, means moving said yieldable member against the action of said yieldable means whereby said movable member is moved relative to said fixed member when said movable member is disengaged from the member moving it against the action of said yieldable means, and means for shifting said lister relative to said printing means to aline different transversely alined portions of the sheet with the printing means.

48. In a printing machine, printing means, a lister for moving a sheet past said printing means in a step-by-step manner and including a relatively fixed member having spaced notches therein, a member movable relative to said fixed member and having yieldable means acting thereon to urge said member in one direction, means engageable in said spaced notches for limiting movement of said relatively movable member, means in said machine for moving said relatively movable member against the action of said yieldable means whereby when said relatively movable member is disengaged from said moving means, said yieldable means moves said yieldable member a distance equivalent to the spacing of adjacent notches in said fixed member, and means for shifting said lister relative to said printing means to aline different transversely alined portions of the sheet with the printing means.

49. In a printing machine through which a series of printing devices having identifying means thereon are fed, printing means, operating means for the printing means, a selector for determining the operation of said printing means from the identifying means on the printing devices and including detecting means, said detecting means including a rockable member having feeling means thereon engageable with said identifying means, means including a yieldable portion and operable from the operating means for moving said rockable member toward the identifying means, movement of said rockable member being limited upon engagement of said feeling means with identifying means, a pivotal member movable in accord with the rockable member, regulating means controlling connection between the printing means and the operating means, and means controlling the operation of the regulating means and operable from said pivotal member.

50. In a printing machine through which a series of printing devices having identifying means thereon are fed, printing means, operating means for the printing means, a selector for determining the operation of said printing means from the identifying means on the printing devices and including detecting means, said detecting means including a rockable member having feeling means thereon engageable with said identifying means, means including a yieldable portion and operable from the operating means for moving said rockable member toward the identifying means, movement of said rockable member being limited upon engagement of said feeling means with identifying means, a pivotal member movable in accord with the rockable member, regulating means controlling the connection between the printing means and the operating means and including a latchable part, and means controlling the operation of said latchable part and operable from said pivotal member.

51. In a printing machine through which a series of printing devices having identifying means thereon are fed, printing means, operating means for the printing means, a selector for determining the operation of said printing means from the identifying means on the printing devices and including detecting means, said detecting means including a rockable member having feeling means thereon engageable with said identifying means, means including a yieldable portion and operable from the operating means for moving said rockable member toward the identifying means, movement of said rockable member being limited upon engagement of said feeling means with identifying means, a pivotal member movable in accord with the rockable member, regulating means controlling the connection between the printing means and the operating means and including a latchable part, control means for regulating the operation of said latchable part and including an arm having flat and recessed portions on the upper surface thereof, and means connected to said pivotal member and optionally engageable with said flat and recessed portions for determining the operation of said control means upon movement of said pivotal member.

52. In a printing machine through which a series of printing devices having identifying means thereon are fed, printing means, operating means for the printing means, a selector including detecting means and a movable part capable of limited movement upon engagement of the detecting means with the identifying means and greater movement when said detecting means does not engage identifying means, control means regulating the connection between said printing means and operating means to regulate the operation of the printing means, and means connecting said control means to said movable part in an optional manner whereby said printing means may be operated either when the detecting means engages identifying means or when said detecting means does not engage said identifying means.

53. In a printing machine through which a series of printing devices having identifying means thereon are fed, printing means, operating means for the printing means, a selector including detecting means and a movable part capable of limited movement upon engagement of the detecting means with the identifying means and greater movement when said detecting means does not engage identifying means, control means regulating the connection between said printing means and operating means and including an arm having a flat and recessed surface, and means connected to said movable part and optionally engageable with said flat or recessed surface whereby said printing means may be operated either when the detecting means engages identifying means or when said detecting means does not engage said identifying means.

54. In a printing machine, operating means, a clutch for controlling the operation, of the operating means, means for holding said clutch engaged, a latch for retaining said holding means, means feeding printing devices from a storage magazine through the machine, means for retracting said latch and including an oscillating detecting member movable toward the printing devices in the magazine and adapted to retract said latch when the supply of printing devices in the magazine is exhausted, and means operable from the printing device feeding means for imparting movement to said oscillating detecting member and including a yieldable part adapted to afford relative movement between the oscillating detecting member and the operating means therefor when said detecting member engages printing devices in the magazine.

55. In a printing machine, operating means, a clutch for controlling the operation of the operating means, means holding said clutch engaged, a latch for retaining said holding means, a printing device storage magazine, means feeding printing devices from the storage magazine through the machine, a detecting member, means operable from the operating means for moving the detecting member toward the printing devices in the magazine whereby said latch is retracted when the supply of printing devices in the magazine is exhausted, and means affording relative movement between the means operable from the operating means and the detecting member when printing devices are stored in said magazine.

56. In a printing machine, a bed, printing means, sheet carrying means mounted for movement on said bed transversely thereof and relative to said printing means whereby impressions may be made at transversely aligned places on a sheet carried by said sheet carrying means, a crank structure for moving said sheet carrying means and the sheet carried thereby transversely on said bed, and means for varying the throw of said crank structure to vary said transverse movement and vary the transverse positioning of the impressions on said sheet.

57. In a printing machine, printing means, a bed, said bed having a transversely extending slot therein, sheet carrying means, a slide mounted in said transversely extending slot, means connecting the sheet carrying member to said slide, a crank structure for moving said slide through said slot, means for imparting a step-by-step movement to said crank structure, and means for varying the throw of said crank structure to vary the movement of said slide through said slot to thereby vary the movement of said carrying member.

58. In a printing machine, printing means, a sheet carriage, means for transversely moving the sheet carriage relative to the printing means, other means for simultaneously moving the sheet carriage longitudinally relative to the printing means, and selectively operated means for varying the longitudinal movement, said means for transversely moving the carriage including adjustable parts for varying the transverse movement of the carriage.

59. In a printing machine, printing means, a bed, sheet carrying means mounted for movement on said bed transversely thereof and relative to said printing means whereby impressions may be made at transversely aligned places on a sheet carried by said sheet carrying means, said bed having transversely extending guiding means thereon, means guiding the sheet carrying means from the transversely extending guiding means, a crank structure for transversely moving the sheet carrying means, means for imparting a step-by-step movement to the crank structure, and means for varying the throw of said crank structure to vary the transverse movement and vary the transverse positioning of the impressions on said sheet.

WALTER T. GOLLWITZER.